(12) United States Patent
Leonelli et al.

(10) Patent No.: US 8,726,285 B2
(45) Date of Patent: May 13, 2014

(54) METHOD AND APPARATUS FOR TRIGGERING WORKFLOW DEPLOYMENT AND/OR EXECUTION

(75) Inventors: Jean-Baptiste Leonelli, New York, NY (US); Trisala Chandaria, Cologny-Geneve (CH)

(73) Assignee: Ciambella Ltd., Tortola (VG)

( * ) Notice: Subject to any disclaimer, the term of this patent is extended or adjusted under 35 U.S.C. 154(b) by 271 days.

(21) Appl. No.: 12/931,292

(22) Filed: Jan. 28, 2011

(65) Prior Publication Data
US 2012/0198457 A1      Aug. 2, 2012

(51) Int. Cl.
*G06F 9/46*      (2006.01)
(52) U.S. Cl.
USPC ........................................................ 718/102
(58) Field of Classification Search
None
See application file for complete search history.

(56) References Cited

U.S. PATENT DOCUMENTS

| | | |
|---|---|---|
| 6,388,683 B1 | 5/2002 | Ishai et al. |
| 2005/0057436 A1 | 3/2005 | Alden et al. |
| 2008/0084575 A1* | 4/2008 | Dantwala .................. 358/1.15 |
| 2009/0049108 A1* | 2/2009 | Forde et al. .................. 707/203 |
| 2009/0070121 A1 | 3/2009 | Leonelli et al. |
| 2009/0070162 A1* | 3/2009 | Leonelli et al. .................. 705/7 |
| 2009/0254903 A1 | 10/2009 | Dufosse et al. |
| 2010/0057826 A1* | 3/2010 | Chow et al. .................. 709/201 |

FOREIGN PATENT DOCUMENTS

JP      2001-282970 A      10/2001

OTHER PUBLICATIONS

International Search Report and Written Opinion mailed Aug. 7, 2012 for PCT Application No. PCT/US2012/022715, 5 pages.

* cited by examiner

*Primary Examiner* — Gregory A Kessler
(74) *Attorney, Agent, or Firm* — Moser Taboada

(57) ABSTRACT

A system and method for triggering deployment of a workflow are provided. The method includes issuing, to a first device (e.g., a server) from application software executing on a second device (e.g., a client computer), an instruction to execute a workflow previously deployed at the first device. The workflow is formed as a function of information associated with a graphical representation of the workflow. The application software may be, for example, software for one or more word-processing, spreadsheet, database, email, instant messenger, presentation, browser, calendar, organizer, media, image-display applications; file management programs and/or operating system shells. Alternatively, the application software may be or include a module associated with such application software. This module may include or be formed as or from one or more plug-ins, add-ons, applets, shared libraries, and/or extensions.

9 Claims, 8 Drawing Sheets

METHOD AND APPARATUS FOR TRIGGERING WORKFLOW DEPLOYMENT AND/OR EXECUTION

CROSS-REFERENCE TO RELATED APPLICATIONS

This application is related to the following co-pending U.S. patent application Ser. No. 11/853,143, filed Sep. 11, 2007, entitled "A System, Method and Graphical User Interface for Workflow Generation, Deployment and/or Execution" naming Jean-Baptiste Leonelli and Trisala Chandaria, as inventors; which is incorporated herein by reference in its entirety for all purposes.

BACKGROUND

1. Field

The following relates to workflow deployment and execution. More particularly, the following relates to a method, apparatus and user interface for triggering deployment and/or execution of one or more workflows.

2. Related Art

A company can employ one or more business processes and other workflows to carry out their core and ancillary businesses. These workflows may include, for example, a workflow to facilitate processing of information as it moves among or within any business disciplines, including purchasing, manufacturing, marketing, sales, accounting, recruitment, information-technology support and the like, of the company and/or its clients, vendors, supplier, etc.

To facilitate the processing of the information, this workflow defines two or more tasks, which are organized and connected in a particular, and hopefully, an efficient fashion. Each of the tasks for may be any automatable activity of the business disciplines in which information input to such task ("input information") may be operated on and/or output. Examples of the tasks include downloading information from remote servers, converting files between formats, processing updates, communicating with customer or order-management systems, sending email messages, automatically backing up changes, etc.

Often, the input information for each of the tasks resides in or has to be entered (e.g., from physical files) into one or more data files of a plurality of computer systems of the company and/or its clients, vendors, supplier, etc. While some of these computer systems employ compatible platforms and protocols ("compatible systems"), some of the computer systems invariably employ disparate platforms and/or protocols ("incompatible systems"). Unfortunately, the incompatible systems make accessing and communicating the input information among the computer systems difficult, at best.

Conventional solutions for automating access to and/or communicating the input information between the compatible and incompatible systems include (i) manual solutions, and (ii) automatic solutions. The manual solutions utilize people to interface with the incompatible systems, whereby such people manually transfer the input information to and from the incompatible computers. The automatic solutions, on the other hand, employ customized software and/or hardware that are specifically adapted to interface with the incompatible systems ("customized interface").

While the conventional solutions may fit a particular need given a certain set of circumstances, such conventional solutions can be costly to the company in terms of time, money, and resources. For example, the company has an initial expense of time, money and resources to create, test, implement and provide support for an initial version of the customized interface. When, however, the input information resides on incompatible systems not considered or overlooked when creating the initial version of the customized interface, the company has an additional expense of time, money and resources to create, test, implement and provide support for an additional version of the customized interface. Moreover, the company may incur other additional expenses of time, money and resources to form new or reworked implementations when the customized interface no longer properly functions, if at all, due to updates, upgrades or other modifications to the computer systems.

Therefore, what is needed is a system and method for facilitating a generation, deployment and/or execution of a workflow in which access to and communication of input information among the computer systems having both compatible and disparate platforms and/or protocols does not require customized interfaces. That is, a system and method for facilitating a generation, deployment and/or execution of a workflow that facilitates interoperability between the computer systems both compatible and disparate platforms and/or protocols. What is further needed is a system and method for facilitating a generation, deployment and/or execution of a workflow in which access to and communication of input information may be provided despite updates, upgrades or other changes to the computer systems having and/or addition of computer systems.

BRIEF DESCRIPTION OF THE DRAWINGS

So the manner in which the above recited features are attained and can be understood in detail, a more detailed description is described below with reference to the Figures illustrated in the appended drawings.

It is to be noted the Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

Architecture Example

Figure 1:
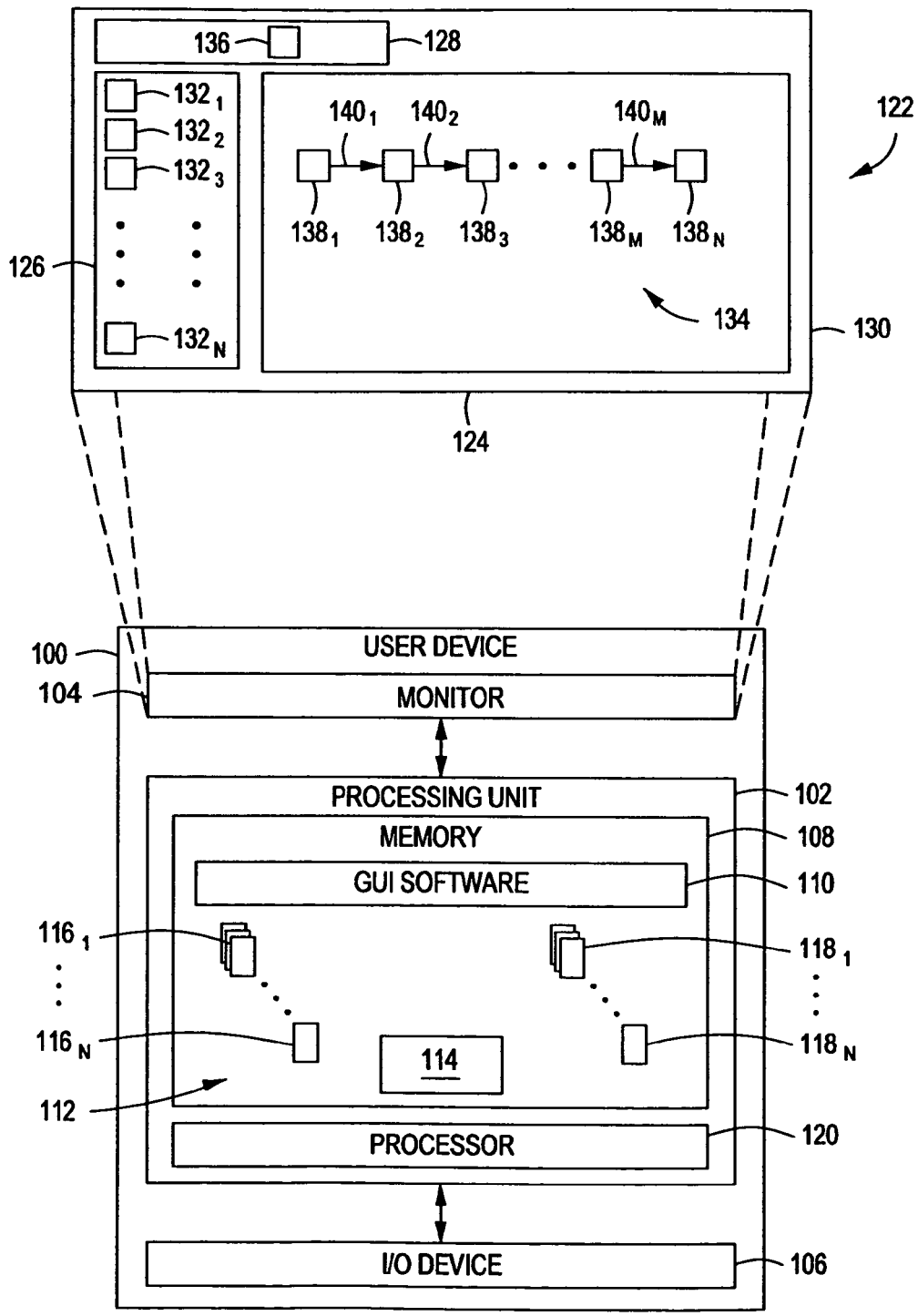
FIG. 1 is a block diagram illustrating an example of a user device for facilitating a generation, deployment and/or execution of a workflow.

FIG. 1 is a block diagram illustrating an example of a user device 100 for facilitating a generation, deployment and/or execution of a workflow. As above, this workflow includes a plurality of tasks; each of which defines a corresponding automatable activity ("task's function") for operating on and/or outputting information input into it.

The user device 100 may be, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the user device 100 includes a processor-based platform that operates on any suitable operating system, such as Microsoft® Windows®, Linux and/or Symbian; and that is capable of executing software.

The user device 100 may, however, include a large number of elements; many of which are not shown in FIG. 1 for simplicity of exposition. Details of example architecture of a user device, which may be representative of the user device 100, are described with reference to FIG. 3. As shown in FIG. 1, the user device 100 includes a processing platform 102 that is operable to control, manipulate or otherwise interact with a monitor or other display device (collectively "monitor") 104 and/or an input/output ("I/O") device 106, via respective couplings.

The monitor 104 may be any suitable device that displays viewable images generated by the processing platform 102. For instance, the monitor 104 may be any of or any combination of a liquid-crystal-display based monitor, a cathode ray tube monitor, a plasma display monitor, a surface-conduction electron-emitter display monitor, an organic light-emitting diode display monitor, or any other monitor that can display viewable images using television and/or computer protocols, such as Super Video Graphics Array, Digital Visual Interface, Phase Alternating Line, SECAM, NTSC, etc.

The I/O device 106 may be any device that accepts input from a user (man or machine) to control, manipulate or otherwise interact with the operation of the processing platform 102. Examples of the I/O device 106 include any of or any combination of pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad. Although shown as one device, the I/O device 106 may be separated into two or more devices; each of which may have, as compared to the I/O device 106, reduced, increased or equivalent functionality.

The processing platform 102 includes memory 108 that is capable of storing (i) software, such as graphical-user-interface ("GUI") software 110; and (ii) one or more records or other data structures (collectively, "records") 112, each of which may be stored as or in a single file or a plurality of files. The records 112 may be structured as text, a table, a database, a distributed hashtable, a distributed concurrent object store, a document formed using a markup or markup-like language, such as eXtensible Markup Language ("XML"), eXtensible Markup Language—Remote Procedure Calling protocol ("XMURPC"); or according to a given protocol, such as Hypertext Transfer Protocol ("HTTP"), Simple Object Access Protocol ("SOAP"); and the like.

The records 112 may include a workflow record 114, workflow-operation records $116_1$-$116_n$, and workflow-sequencing records $118_1$-$118_m$. The workflow record 114 may be stored, for example, as an XML document in one or more files. The workflow-operation records $116_1$-$116_n$ may be stored in one or more files, and the workflow-sequencing records $118_1$-$118_m$, may be stored in one or more files.

As described in more detail below, each of the workflow-operation records $116_1$-$116_n$ corresponds to one of the workflow's tasks. Each of these tasks may be configured as a sequence of logical operations for completing such tasks along with preliminary set up operations and/or subsequent validation operations for achieving proper execution of the tasks. The task's logical, set-up and/or validation operations may take the form of abstractions of functionality associated with one or more complex processes for obtaining, transforming and outputting information; rather than, taking form of information for performing individual low-level programming constructs that handle a small portion of such functionality, such as calling a given function or assigning a given value to a variable. To facilitate this, the workflow-operation records $116_1$-$116_n$ may include one or more parameters for each of the corresponding tasks. The parameters for each of the tasks ("task's parameters") may include an indication of the task's function; one or more references to the task's input information, and/or one or more references to services, settings, rules, variables, expressions, templates, characteristics, directives, commands, fields, etc. for generating, deploying and/or executing the task.

Each of the workflow-sequencing records $118_1$-$118_m$ corresponds to a sequencing of one task to another task. To facilitate this, each of the workflow-sequencing records $118_1$-$118_m$ may include one or more parameters associated with such sequencing ("sequence's parameters"). The sequence's parameters may include an indication of the tasks for sequencing, an order of execution of the tasks, a set of conditions governing the order of execution of the tasks and/or one or more references to services, settings, rules, variables, expressions, templates, characteristics, directives, commands, etc. for generating, deploying and/or executing the sequencing.

The workflow record 114 may include the task's parameters for all or a subset of the tasks and the sequence's parameters for all or a subset of the sequences in the workflow. Alternatively, the workflow record 114 may include the task's parameters for all or a subset of the tasks, and be arranged in a sequence in accord with the sequencing. The workflow record 114, workflow-operation records $116_1$-$116_n$, and workflow-sequencing records $118_1$-$118_m$ may take other forms and include other information as well.

In addition to the memory 108, the processing platform 102 includes one or more processors (collectively "processor") 120 that execute (e.g., launches, generates, runs, maintains, etc.) and operates on a suitable operating system. The processor 120 may be capable of executing the GUI software 110, storing the records 112 in the memory 108, dispatching the workflow record 114 to facilitate the generation, deployment and/or execution of the workflow, issuing triggers and/or issuing one or more commands and/or instructions to cause the generation, deployment and/or execution of the workflow. Examples of the processor 108 may include conventional processors, microprocessors, multi-core processors and/or microcontrollers.

The GUI software 110, when executed by the processor 120, may execute a GUI and render on the monitor 104 at least one display screen 122 of the GUI. The display screen 122 includes a window 124. The window 124, in turn, includes a widget pane 126, a widget toolbar 128 and a workflow pane 130.

The widget pane 126 includes task widgets $132_1$-$132_n$. The task widgets $132_1$-$132_n$ represent, graphically, the tasks that may be selected for inclusion in the workflow. Such selection is effected by including instances of the task widgets $132_1$-$132_n$ in a graphical representation of the workflow ("graphical workflow") 134 set forth on the workflow pane 130. The task widgets $132_1$-$132_n$, and any instances thereof, may be rendered by the GUI software 110 as icons and the like.

The widget toolbar 128 includes a sequencing widget 136; instances of which may also be used to form the graphical workflow 134, and in turn, the workflow. The sequencing widget 136 represents, graphically, a coupling that may be used to couple together and sequence the tasks. The sequencing widget 136, and any instances thereof, may be rendered by GUI software 110 as a connector line and the like.

The workflow pane 130 includes the graphical workflow 134. The graphical workflow 134 may include task-widget instances $138_1$-$138_n$, sequenced together with sequencing-widget instances $140_1$-$140_m$. Each of the task-widget instances $140_1$-$140_n$, may be an instance of any of the task widgets $132_1$-$132_n$, and each of the sequencing-widget instances $138_1$-$138_m$ may be an instance of the sequencing-widget 136.

The task-widget instances $138_1$-$138_n$ may be associated with the workflow-operation records $116_1$-$116_n$, respectively; and the workflow-operation records $116_1$-$116_n$ may include the tasks' parameters of the tasks represented by the task-widget instances $138_1$-$138_n$. Similarly, the sequencing-widget instances $140_1$-$140_m$ may be associated with the workflow-sequencing records $118_1$-$118_m$, respectively; and the workflow-sequencing records $118_1$-$118_n$ may include the sequences' parameters of the sequences represented by the sequencing-widget instances $140_1$-$140_n$.

Although the workflow-operation records $138_1$-$138_n$, the workflow-sequencing records $140_1$-$140_m$ and the workflow record 114 are delineated above as three separate entities, the delineation and the use of three entities may be dispensed with. For example, the workflow record 114 (or any other of the records 112) may include the tasks' parameters of the tasks represented by the task-widget instances $138_1$-$138_n$ and the sequence's parameters of the sequences represented by the sequencing-widget instances $140_1$-$140_n$.

Alternatively, the workflow record 114 (or any other of the records 112) may include the tasks' parameters of the tasks represented by the task-widget instances $138_1$-$138_n$, and be arranged in a sequence in accord with a sequencing represented by the collective sequences of the sequencing-widget instances $140_1$-$140_n$. To facilitate the foregoing, the task-widget instances $138_1$-$138_n$ and the sequencing-widget instances $140_1$-$140_m$ may be associated with the workflow record 114, directly. The workflow record 114, the workflow-operation records $116_1$-$116_n$ and the workflow-sequencing records $118_1$-$118_m$ may take other forms and be arranged in other ways, as well.

Additionally, although the window 124 includes only two panes and one toolbar, as shown, the window 124 may include more or fewer panes and more or fewer toolbars. In addition, the window 124 may include tabs, dropdown menus, command menus, etc. The widget pane 126 may include more or fewer task-type widgets than shown; and the widget toolbar 128 may include more sequencing-type widgets than shown.

As an alternative, the widget pane 126 and the widget toolbar 128 may be combined into a single pane or toolbar that includes both of the task-type and sequencing-type widgets. As another alternative, one or both of the widget pane 126 and the widget toolbar 128 may include both of the task-type and sequencing-type widgets.

As yet another alternative, one or more of the sequencing-type widgets 136 may be combined, integrated with or otherwise formed integral to the task widgets $132_1$-$132_n$ so as to form unified widgets. The unified widgets obviate having separate sequencing-type widgets for each task-type widget. Such unified widgets may be rendered by the GUI software 110 as icons having connector elements, and the like. Instances of the unified widgets on the workflow pane 130 may be associated with both the workflow-operation records $116_1$-$116_n$ and the workflow-sequencing records $118_1$-$118_n$. Alternatively, the instances of the unified widgets may be associated with the workflow record 114 directly.

Operation Example

Figure 2:
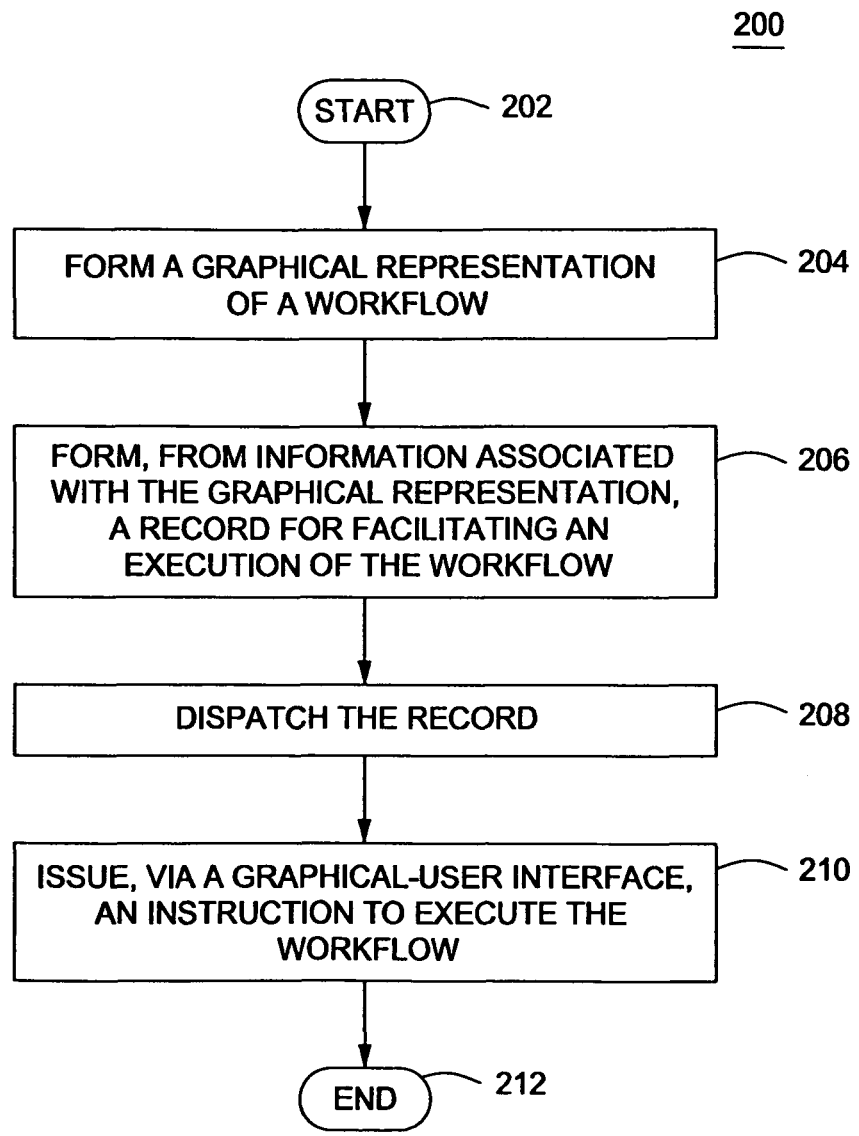
FIG. 2 is a flow diagram illustrating a flow for facilitating a facilitating a generation, deployment and/or execution of a workflow.

Referring now to FIG. 2, a flow diagram illustrating a flow 200 for facilitating a generation, deployment and/or execution of a workflow is shown. For convenience, the flow 200 is described with reference to the user device 100 of FIG. 1. The flow 200, however, may be carried out using other architectures as well.

The flow 200 starts at termination block 202, whereupon the processor 120 executes the GUI software 110 to form the GUI and render the display screen 124. After termination block 202, the flow 200 transitions to process block 204.

As shown in process block 204, the GUI software 110 may form the graphical workflow 134. The GUI software 110 may do so in response to one or more manipulations of the GUI by the user via the I/O device 106. For example, the GUI software 110 may render the task-widget instances $138_1$-$138_n$ on workflow pane 130 responsive to the I/O device 106 manipulating the GUI to select from the task widgets $132_1$-$132_n$ and to place (e.g., by dragging and dropping) such instances on the workflow pane 130.

In addition, the GUI software 110 may render the sequencing-widget instances $140_1$-$140_m$ on workflow pane 130 in response to the I/O device 106 manipulating the GUI to (i) select such instances from widget toolbar 128, (ii) place the instances on the workflow pane 130, and (iii) couple the task-widget instances $138_1$-$138_n$ with the sequencing-widget instances $140_1$-$140_m$.

The GUI software 110 may obtain, via manipulation of the GUI by the I/O device 106, the tasks' and sequences' parameters for populating the records 114, $116_1$-$116_n$ and $118_1$-$118_m$. For example, the GUI software 110 may obtain, as a function of the presence of the task-widget instances $138_1$-$138_n$ in the graphical workflow 132, the tasks' parameters that define the tasks' functions. The task-widget instance $138_1$ may represent a task for starting the workflow ("start task"), for instance. The start task's parameters may include information for the start task's function, which as noted, is to mark a start the workflow. The presence of the task-widget instance $138_1$ in graphical workflow 134 allows for population of the records 114 and/or $116_1$-$116_n$ with the start task's parameters.

Alternatively and/or additionally, the GUI software 110 may supplement the start and/or other tasks' parameters by way of a user using a keyboard or other I/O device to enter a character or a string of characters into one or more fields of one or more display screens (not shown) of the GUI. Entering the information this way may also be used as an alternative to selecting and placing (e.g., dragging and dropping) the task-widget instances $138_1$-$138_n$ onto the workflow pane 130. For example, the user may enter a character or a string of characters into one or more of the fields of the display screens of the GUI for each of the task-widget instances $138_1$-$138_n$. The GUI software 110, in turn, may interpret such entries, and responsively render the task-widget instances $138_1$-$138_n$ on the GUI.

Like the tasks' parameters, the GUI software 110 may obtain, as a function of the presence and layout of the graphical workflow 132, the sequences' parameters that may be used to develop an order of execution of the task-widget instances $140_1$-$140_n$. For example, the sequences' parameters may be obtained as a function of each of the links (as rendered by the sequencing-widget instances $140_a$-$140_m$) that connect an output of one of the task-widget instances $138_1$-$138_n$ to an input of another of the task-widget instances $138_1$-$138_n$. Alternatively and/or additionally, the GUI software 110 may obtain the sequences' parameters by way of entering a character or a string of characters into one or more fields of one or more display screens (not shown) of the GUI. Entering the parameters this way, in turn, may provide an alternative to selecting and placing the sequencing-widget instances $140_a$-$140_m$ on the workflow pane 130. As above, the GUI software 110, in turn, may interpret the entries, and responsively render the sequencing-widget instances $140_a$-$140_m$ that create the links connecting the task-widget instances $138_1$-$138_n$.

After process block 204, the flow may transition to process block 206. As shown in process block 206, the GUI software 110 may generate or otherwise form the workflow record 114 from the graphical workflow 134. The GUI software 110, for example, may populate the workflow record 114 with the tasks' and sequences' parameters that it garnered in process block 204.

As alternative to populating the workflow record 114 directly, the GUI software 110 may populate the workflow-operation records $116_1$-$116_n$ and the workflow-sequencing records $118_1$-$118_m$, first. For example, the GUI software 110 may populate the workflow-operation records $116_1$-$116_n$ with the tasks' parameters associated with the task instances $138_1$-$138_n$ garnered in process block 204. In addition, the GUI software 110 may populate the workflow-sequencing records $118_1$-$118_m$ with the sequences' parameters associated with the sequencing-widget instances $140_1$-$140_m$ garnered in process block 204. After populating the workflow-operation and workflow-sequencing records $116_1$-$116_n$, $118_1$-$118_m$, the GUI software 110 may insert the workflow-operation records $116_1$-$116_n$ into the workflow record 114 in accordance with the sequencing.

Additionally, the GUI software 110 may arrange the records 114, $116_1$-$116_n$ and $118_1$-$118_m$ in a particular fashion. For example, the tasks' and sequences' parameters in records 114, $116_1$-$116_n$ and $118_1$-$118_m$ may be arranged, in terms of object-oriented programming, as respective instances of objects of one or more given classes. As an example, the task-widget instances $138_1$-$138_n$ may define, respectively, the start task and a task for stopping the workflow ("stop task"). The workflow-operation records $116_1$, $116_2$ define the task's parameters for deployment of start and stop instances of start and stop objects of start and stop classes, respectively. The workflow-sequencing records $118_1$-$118_m$ and workflow record 114 may be arranged in a similar fashion.

The GUI software 110 may also prepare the workflow record 114 for dispatch to a target device to facilitate generating, deploying and/or executing the workflow. For example, the GUI software 110 may format the workflow record 114 according to one or more suitable information exchange mechanisms. Examples of such exchange mechanisms include: American Standard Code for Information Interchange ("ASCII"), XML, XML/RPC, HTTP, SOAP, shared memory, sockets, local or remote procedure calling, etc. In addition to facilitating sharing and replication of the workflow record 114, the exchange mechanisms also beneficially facilitate interoperability between the processing platform 102 and the target device, such as the host device 306 (FIG. 3), to which the workflow record 114 may be dispatched.

After process block 206, the flow 200 transitions to process block 208. As shown in process block 208, the GUI software 110 may dispatch the workflow record 114 to facilitate generating, deploying and/or execution of the workflow. To do this, the GUI software 110 may cause the processing platform 102 to dispatch the workflow record 114 from the user device 100 to the target device. The dispatch may occur in response to a trigger initiated by the GUI software 110 (e.g., in response to the user's manipulation of the GUI) or in response to a query from the target device.

Alternatively, the GUI software 110 may cause the processing platform 102 to dispatch the workflow record 114 on a periodic basis using, for example, a routine for synchronizing and/or replicating the workflow record 114 on the target device. After process block 208, the flow 200 transitions to process block 210.

As shown in process block 210, the GUI software 110 may cause the processing platform 102 to issue a command, which emanates from the GUI, to cause the execution of the workflow. The execution command may be, for example, a trigger emanating from the GUI. This trigger may be initiated in response to the user's manipulation of the GUI.

The GUI software 110 may cause the processing platform 102 to issue the execution command at any time after or at the same or substantially the same time as the time of dispatch of the workflow record 114. As described in more detail below, the target device may, responsive to the execution command, interpret the workflow record 114 directly to execute the workflow.

As an alternative to directly interpreting the workflow record 114, the target device may generate, as a function of the workflow record 114, computer-executable instructions (or, simply, "code") for carrying out the workflow ("workflow-executable code"). The target device may generate the workflow executable code at a time prior to execution time or at the same or at substantially the same time as execution time. To facilitate the former, the GUI software 110 and/or the processing platform 102 may issue, prior to the execution command, another command to cause the target device to generate the workflow-executable code. The target device may also generate one or more tests for testing the workflow-executable code.

After the process block 210, the flow 200 transitions to termination block 212, at which point the flow 200 terminates. Alternatively, the flow 200 may be repeated periodically, in continuous fashion, or upon being triggered as a result of a condition, such as an addition, deletion or modification of one or more of the tasks of the workflow. As another alternative, the process block 210 may be repeated periodically, in continuous fashion, or upon being triggered as a result of a condition, so as to cause additional deployments of the workflow.

System Architecture Example

Figure 3:
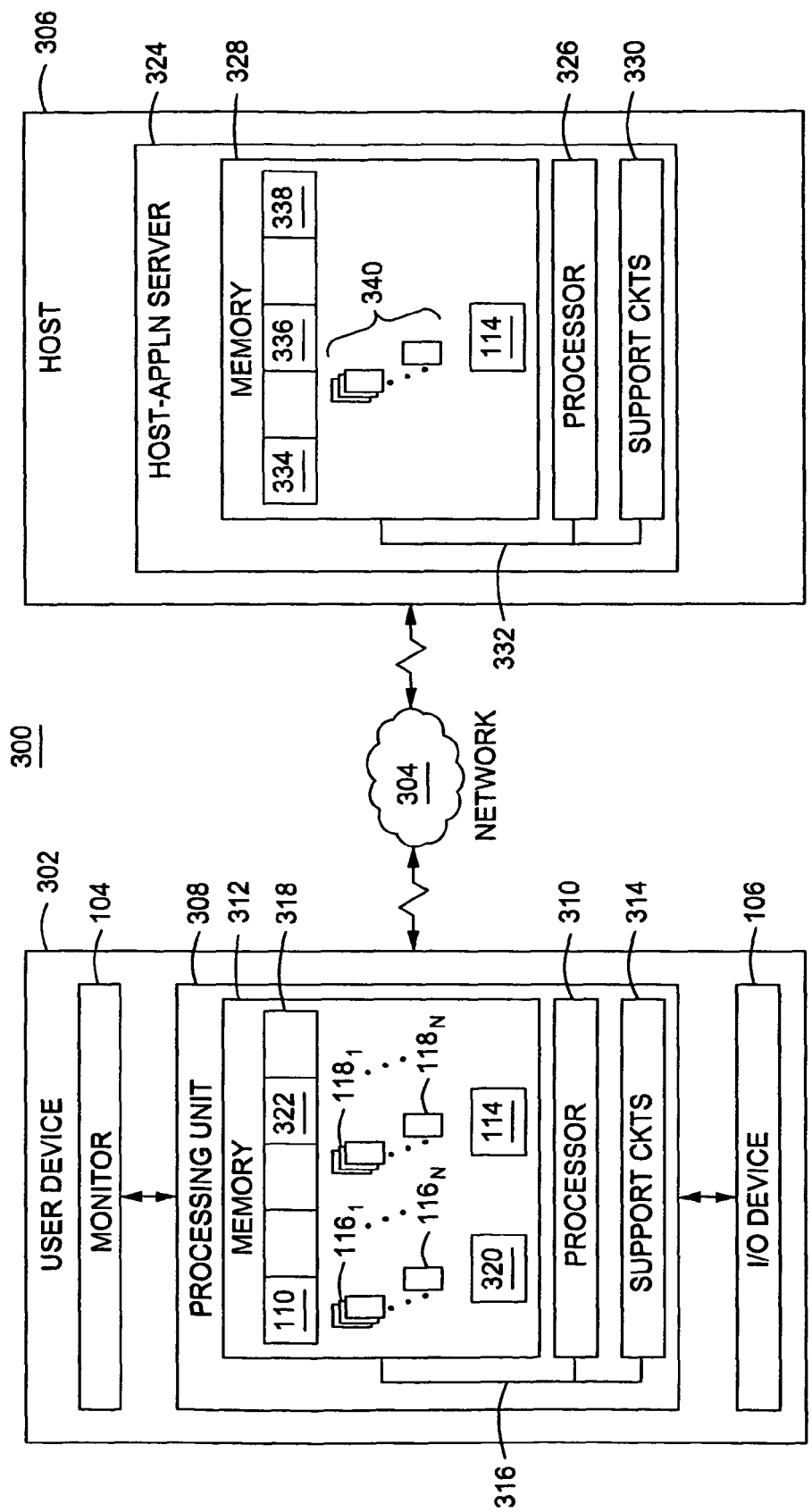
FIG. 3 is a block diagram illustrating a system for generating, deploying and/or executing a workflow.

FIG. 3 is a block diagram illustrating a system 300 for facilitating a generation, deployment and/or execution a workflow. The system 300 includes a user device 302 and a host device ("host") 306. The user device 302 and host 304 may be communicatively coupled together via a network 304. This way, the user device 302 and host 304 may exchange the input and/or deployment information and other information associated with deploying of the workflow via one or more communications carried over the network 304.

The network 304 may be a partial or full deployment of most any communication or computer network, including any combination of a public or private, terrestrial wireless or satellite, or wireline network. As such, the network 302 may include network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like.

The network elements may include circuit-switched as well as packet-data elements to provide transport of the workflow record 114, the triggers, the execution command and other information for generating, deploying and/or executing the workflow (collectively "workflow content"), and may be configured to communicate such workflow content using any number of protocols and in any manner consistent with providing such information to the user device 302 and host 304. These protocols may include standardized, proprietary, open-source, and freely-available communication protocols for communicating content in circuit-switching and/or packet data networks, and the like.

The user device 302 is similar to the user device 100 of FIG. 1, except as described herein below. The user device 302 may be any computing device, system and the like, and may be formed in a single unitary device and concentrated on a single server, client, peer or other type node. Alternatively, the user device 302 may be formed from one or more separate devices, and as such, may be distributed among a number of server, client, peer or other type nodes. In addition, the user device 302 may be scalable (i.e., may employ scale-up and/or scale-out approaches).

As shown, the user device 302 may include a processing platform 308 that is operable to control, manipulate or otherwise interact with the monitor 104 and/or an I/O device 106, via respective couplings. The processing platform 308 includes one or more processing units (collectively "processor") 310, memory 312, supports circuits 314 and bus 316. The processor 310 may be one or more conventional processors, microprocessors, multi-core processors and/or microcontrollers. The support circuits 314 facilitate operation of the processor 310 and may include well-known circuitry or circuits, including, for example, an I/O interface; one or more network-interface units ("NIUs"); cache; clock circuits; power supplies; and the like.

The processor 310 may use the NIUs for exchanging the workflow content the host 306 via the network 304. Accordingly, the NIUs may be adapted for communicating over any of the terrestrial wireless, satellite, and/or wireline media.

The memory 312 may store (and receive requests from the processor 310 to obtain) software 318, the records 112, 114, $116_1$-$116_n$ and $118_1$-$118_m$ and various other stored software packages, such as an operating system 320. The memory 312 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like. In addition, the memory 312 may store (and receive requests from the processor 310 to obtain) operands, operators, dimensional values, configurations, and other data that are used by the operating system 320 and the software 318 to control the operation of and/or to facilitate performing the functions of the user device 302.

The bus 320 provides for transmissions of digital information among the processor 310, the memory 312, support circuits 314 and other portions of the user device 302 (shown and not shown). The I/O interface is adapted to control transmissions of digital information between (shown and not shown) components of the user device 302. In addition, the I/O interface is adapted to control transmissions of digital information between I/O devices disposed within, associated with or otherwise attached to the user device 302. Examples of the I/O devices include the I/O device 106, the monitor 104, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The operating system 320 may include code for operating the user device 302 and for providing a platform onto which the software 318 can be executed. The software 318 may include the GUI software 110 and other user-device software 322, which may carry out the exchange of the workflow content using communication and security protocols compatible with the user and host devices 302, 306.

The GUI software 110 and user-device software 322 may be in any of a standalone, client/server, peer-to-peer and other format. The GUI software 110 may include code for accessing one or more services offered by the host 306. Using this code and information obtained from a user, the GUI software 110 is operable to substantiate its identity, and in turn, receive authorization to access (e.g., view, configure and/or execute) the services offered by the host 306.

The host 306 may include one or more servers, including a host-application server 324. The host-application server 324 may be deployed in one or more general or specialty purpose computers, personal computers, mainframes, minicomputers, server-type computers and/or any a processor-based platform that operates on any suitable operating system, such as Microsoft® Windows® and/or Linux; and that is capable of executing software.

Like the user device 302, the host-application server 324 may include a large number of elements; many of which are not shown in FIG. 3 for simplicity of exposition. The elements of host-application server 324 may be formed in a single unitary device and concentrated on a single server, client, peer or other type node. Alternatively, the elements of the host-application server 324 may be formed from two or more separate devices, and as such, may be distributed among a number of server, client, peer or other type nodes.

As shown, the host-application server 324 includes one or more processing units (collectively "processor") 326, memory 328, supports circuits 330 and bus 332. The processor 326 may be one or more conventional processors, microprocessors, multi-core processors, microcontrollers and the like.

The bus 332 provides for transmissions of digital information among the processor 326, memory 328 and support circuits 330 and other portions of the host-application server 324 (not shown). The support circuits 330 facilitate operation of the processor 326, and may include well-known circuitry or circuits, including, for example, one or more input/output I/O interfaces; one or more NIUs; cache; clock circuits; power supplies and the like.

The I/O interface provides an interface to control the transmissions of digital information between components of host-application server 324 (shown and not shown). In addition, the I/O interface provides an interface to control the transmissions of digital information between I/O devices (not shown) associated with or otherwise attached to the host-application server 324. The I/O devices (not shown) may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The NIUs facilitate exchange (e.g., sending and/or receiving) of the workflow content. Accordingly, the NIUs may be adapted for communicating over terrestrial wireless, satellite, and/or wireline media.

The memory 328 may store and may be queried by the processor 326 to obtain various software packages, such as operating system 334, application-server software 336 and workflow-application software 338. The memory 328 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

In addition, the memory 328 may store the workflow record 114 and one or more libraries 340 for generating the workflow-executable code. The libraries 340, which may be written in C++, for example, may include routines for generating the workflow-executable code that is associated with each of the tasks ("task routines"). Additionally, the libraries 340 may include routines for sequencing the task routines in accordance with the sequences' parameters set forth in the workflow record 114 ("sequence routines").

The memory 328 may also store operands, operators, dimensional values, configurations, and other data that may be used by the application-server software 336 and the operating system 334 to control the operation of and/or facilitate performing the functions of the host-application server 324.

The host-application server 324 may be deployed in accordance with the scale-up and/or scale-out approaches. Using the scale-up approach, the host-application server 324 may increase its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host-application server 324 may increase its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a multi-node cluster approach), etc.

The operating system 334 may include and/or be embodied in various software and/or executable instructions or code for operating the host-application server 324. The operating system 334, when executed by the processor 326, provides a platform on which the application-server software 336 and workflow-application software 338 can be executed.

The workflow-application software 334, when executed by the processor 326, is operable to generate, deploy and/or execute the workflow. To facilitate this, the workflow-application software 122 may include an interpreter for interpreting the workflow record 114. The interpreter may, for example, include code for directly interpreting the workflow record 114 at execution time so as execute the workflow responsive to the execution command.

Alternatively, the workflow-application software 122 may, for example, include a workflow-builder module and a workflow-deployment module. The workflow-builder module, when executed by the processor 326, is operable to obtain the workflow record 114, and generate, as a function of the workflow record, the workflow-executable code. To generate the workflow-executable code, the workflow-builder module 124 may include a parser and a code generator.

The parser includes code for parsing the tasks' and/or sequences' parameters from the workflow record 114 ("parsed information"). The parser may also include functionally for verifying that the workflow record 114 is well formed and valid.

The code generator includes code for inspecting the parsed information to determine which of the libraries 340 correspond to the tasks, and for combining the parsed information with one or more of such libraries 340 so as to form sets of code ("parsed-code sets"). To facilitate this, the code generator may also include code for sequencing the parsed information in accordance with sequencing reflected in the parsed information. The code generator may also include code for arranging or rearranging, dynamically and/or via user interaction, the parsed information so as to deviate from the sequencing reflected in the parsed information and provide another order of execution of the task of the workflow. This may be done for efficiency (e.g., by analyzing the parse information and determining an optimally-efficient execution sequence), handing branching, handling errors, etc.

The code generator may also include code for combining with the parsed-code sets with one or more of the libraries 340 for binding the parsed-code sets together ("binding libraries"). This code may use the binding libraries to facilitate transfer of appropriate portions of the tasks' and/or sequences' parameters between adjacent parsed-code sets.

The workflow-builder module may optionally include a compiler (not shown). The compiler includes code for compiling the workflow-executable code for execution by the workflow-deployment module 126. Alternatively, the workflow-builder module 124 might not compile the workflow-executable code until runtime or at all, depending, of course, on which programming language is used to generate the workflow-executable code.

The workflow-deployment module, when executed by the processor 326, is operable to execute the workflow-executable code. The workflow-deployment module may execute the workflow-executable code in response to receiving or otherwise obtaining the execution command via the network 304. To carry out execution of the workflow-executable code, the workflow-deployment module may be configured for provisioning other modules of the workflow-application software 338 and the application-server software 340 (as described in more detail below).

The workflow-builder and workflow-deployment modules are described herein as separate entities for ease of exposition. The workflow-builder and workflow-deployment modules or functionality thereof, however, may be intermingled or otherwise combined within the workflow-application software 324 or not exist at all. Alternatively, the workflow-application software 324 may include the same or substantially the same functionality as the workflow-builder and workflow-deployment modules. As another alternative, each of the workflow-builder and the workflow-deployment modules may be entities (e.g., standalone software packages) separate and apart from each other and/or the workflow-application software 324.

Workflow-Deployment Operation

Figure 4:
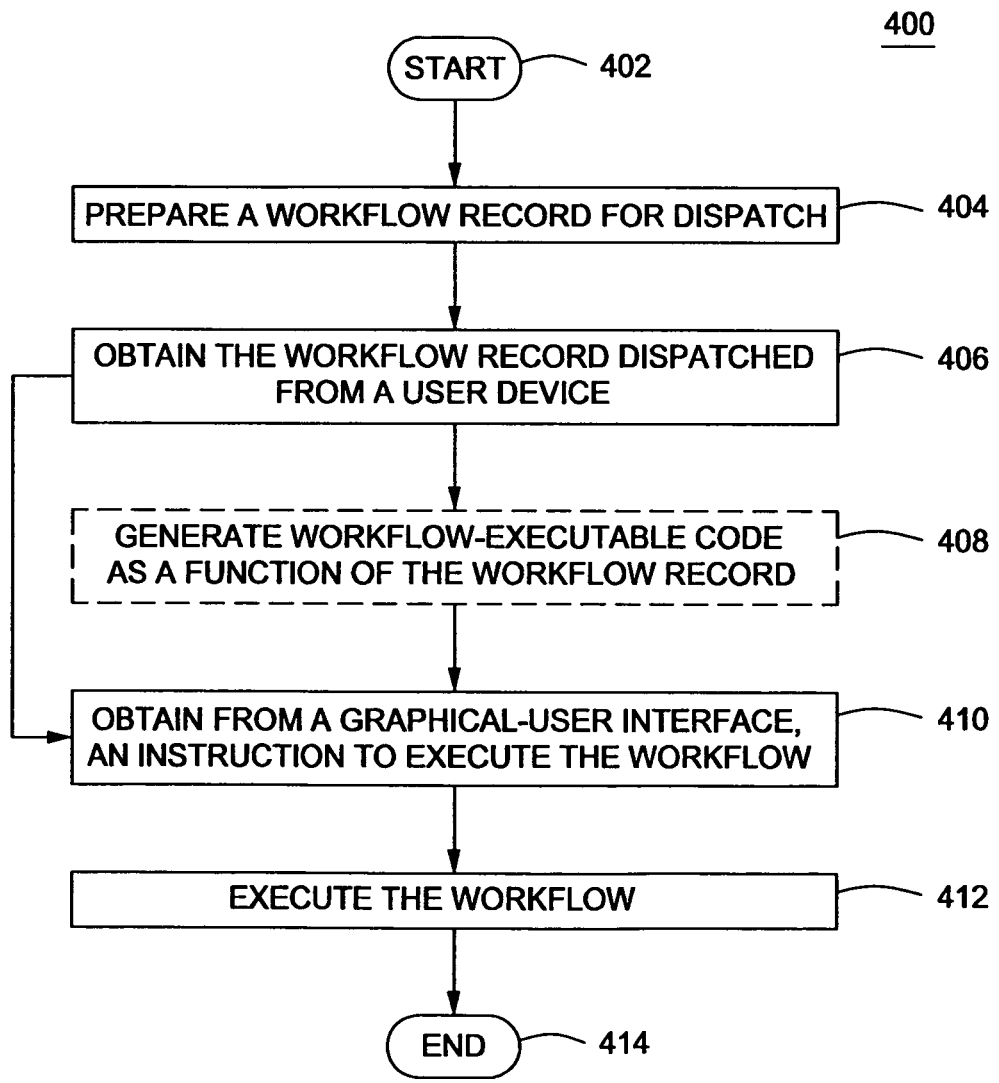
FIG. 4 is a flow diagram illustrating a flow for facilitating a generation, deployment and/or execution of a workflow.

Referring now to FIG. 4, a flow diagram illustrating a flow 400 for facilitating a facilitating a generation, deployment and/or execution of a workflow is shown. For convenience, the flow 400 is described with reference to the system 300 of FIG. 3. The flow 400, however, may be carried out using other architectures as well.

The flow 400 starts at termination block 402, whereupon the user device 302 executes the GUI software 110 to form the GUI and render the display screen 124. After termination block 402, the flow 400 transitions to process block 404.

As shown in process block 404, the user device 302 via the GUI software 110 prepares the workflow record 114 for dispatch. The GUI software 110 may do so in accordance with process blocks 204, 206 of FIG. 2. The GUI software 110 may prepare the workflow record 114 for dispatch in other ways as well. After process block 404, the flow 400 transitions to process block 406.

As shown in process block 406, the workflow-application software 338 obtains the workflow record 114 from the GUI software 110. To do this, the workflow-application software 338 may receive, via the network 304, the workflow record 114 in response to the dispatch caused by manipulation of the GUI or, alternatively, caused by the synchronization and/or replication routines. The GUI software 110 and the workflow-application software 338 may employ any of the suitable information exchange mechanisms to carryout the dispatch and the reception of the workflow record 114. After process block 406, the flow 400 may transition to optional process block 408 or to process block 410.

As shown in optional process block 408, the workflow-application software 338 may generate the workflow-executable code as a function of the workflow record 114. The workflow-application software 338 may do this as follows.

The workflow-application software 338 may pass the workflow record 114 to the workflow-builder module. The workflow-builder module, in turn, may pass the workflow record 114 to the parser. The parser may parse the parsed information from the workflow record 114. The parsed information includes the tasks' and/or sequences' parameters from the workflow record 114. The parser may then pass the parsed information to the code generator.

The code generator may inspect the parsed information to determine which of the libraries 340 matches the parsed information. This may include, for example, the code generator inspecting the tasks' parameters set forth in the parsed information to determine the tasks included in the workflow (e.g., by inspecting the indication of the task's function in each task's parameters).

In addition to determining the tasks included in the workflow, the code generator may sequence the tasks in accordance with sequencing reflected in the parsed information. To carry this out, the code generator may first cull the sequences' parameters from the parsed information so as to obtain the sequencing. Then, the code generator may arrange the parsed-code sets according to the sequencing so that the tasks are carried out in the sequence defined by the workflow (as represented by the graphical workflow 134). Alternatively, the code generator may arrange or rearrange, dynamically and/or via user interaction, the tasks in an order that is different from the sequence defined by the sequencing. The code generator may do this, as noted above, to obtain an optimally-efficient execution sequence and/or to handle branching, to handle errors, etc.

In addition, the code generator may search through the libraries 340 to determine the libraries that match (e.g., have patterns that are consistent with, the same as and/or substantially the same as) the tasks' and/or sequences' parameters ("matching libraries"). After locating the matching libraries, the code generator may combine the parsed information with the matching libraries so as to form parsed-code sets. The code generator may, for example, form each of the parse-code sets by applying one task's parameters to the matching libraries that correspond to such task. This may include, for example, incorporating the criteria specified in the task's and/or sequences' parameters into the code of the matching libraries. In addition, the code generator may configure the parse-code sets or include binding libraries to link together the parsed-code sets so that appropriate portions of the tasks' and/or sequences' parameters transfer between adjacent parsed-code sets. Once linked, the parsed-code sets form the workflow-executable code.

The code generator may, optionally, pass the workflow-executable code to the compiler. The compiler, in turn, may compile the workflow-executable code to ready it for execution by the workflow-deployment module 126. Alternatively, the workflow-builder module 124 might not compile the workflow-executable code until runtime or at all.

After process block 408, the flow 400 transitions to process block 410. As shown in process block 410, the workflow-application software 338 obtains the execution command from the GUI software 110 via the network 304. The GUI software 110 and the workflow-application software 338 may employ any of the suitable information exchange mechanisms to carryout the dispatch and the reception of the execution command. As noted above, the execution command may be received some time after receiving the workflow record 114 or, alternatively, at or substantially at the same time as the workflow record 114. After process block 410, the flow 400 transitions to process block 412.

As shown in process block 412, the workflow-deployment module executes the workflow. Responsive to the execution command, the workflow-application software 338 may directly interpret the workflow record 114 so as to carry out the workflow.

If not directly interpreted, then the workflow-application software 338 may indicate to the workflow-deployment module that it received the execution command. Alternatively, the workflow-application software 338 may pass the execution command to the workflow-deployment module to cause the workflow-deployment module to execute the workflow. The workflow-deployment module may do so in response to the execution command.

When the execution command is received at the workflow-application software 338 prior to generating of the workflow-executable code, the workflow-application software 338 and/or the workflow-deployment module wait for the generation of the workflow-executable code to complete. Thereafter, the workflow-application software 338 may indicate to the workflow-deployment module to carry out execution the workflow-executable code. The workflow-deployment module may execute the workflow-executable code at any time after generation of the workflow-executable code and receiving the execution command.

The workflow-application software 338 may execute the workflow (via direct interpretation or the workflow-executable code) in a test mode or a production mode. In the test mode, the workflow-application software 338 may develop one or more tests to test the workflow, and execute the workflow against the test for evaluation. When executing the workflow against the test, the input information may mimic the input information for the production mode. In the production mode, the workflow-application software 338 may execute the workflow using the input information for the production mode.

To facilitate executing the workflow (via direct interpretation or the workflow-executable code), the workflow-application software 338 may provision the host-application server 324 (e.g., by provisioning one or more modules of the workflow-application software 338 and/or the application-server software 340 for the tasks to receive service. The workflow-application software 338 may provision the host-application server 324 as a function of each task's functionality and criteria. Examples of the tasks and associated functionality and criteria are described in more detail with respect to FIGS. 5 and 6.

After the process block 412, the flow 400 transitions to termination block 414, at which point the flow 400 terminates. Alternatively, the flow 400 may be repeated periodically, in continuous fashion, or upon being triggered as a result of a condition, such as a command or trigger. As another alternative, the process block 410 may be repeated periodically, in continuous fashion, or upon being triggered as a result of a condition, such as additional execution commands, so as to execute the workflow. As yet another alternative, the process block 412 may be repeated periodically (e.g., on a given schedule or other basis), in continuous fashion, or upon being triggered as a result of a condition so as to re-execute the workflow.

Alternative System Architecture Example

Figure 5:
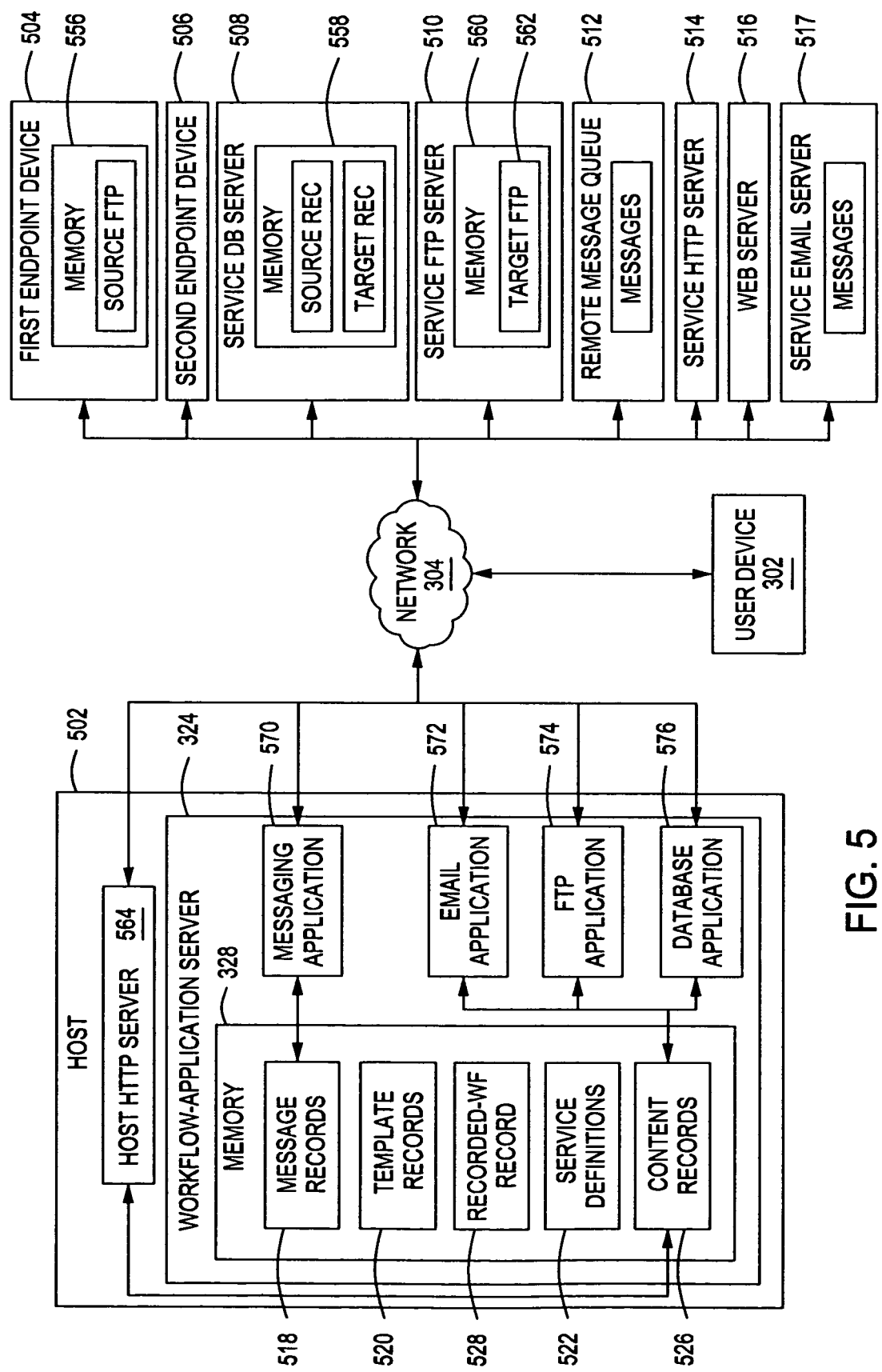
FIG. 5 is a block diagram illustrating a another system for generating, deploying and/or executing a workflow.

FIG. 5 is a block diagram illustrating a system 500 for generating, deploying and/or executing a workflow. The system 500 is similar to the system 300 of FIG. 3, except as described herein. The system 500 includes the user device 302, a host device ("host") 502, a first endpoint device 504, a second endpoint device 506, a service-database server 508, a service-FTP server 510, a remote-message store 512, a service-HTTP server 514, a web server 516 and a service-email server 517; each of which may be communicatively coupled to another via the network 304.

Each of the first endpoint device 504, second endpoint device 506, service-database server 508, service-FTP server 510, remote-message store 512, service-HTTP server 514, web server 516 and the service-email server 517 (collectively "remote devices") may be any processor-based platform that operates on any suitable operating system, such as Microsoft® Windows®, Linux and/or Symbian; and that is capable of executing software. Each of the remote devices 504-517 and may include a large number of elements; most of which are not shown in FIG. 5 for simplicity of exposition.

The elements of each of the remote devices 504-517 may be formed in a single unitary device and concentrated on a single server, client, peer or other type node. Alternatively, the remote devices 504-517 may be formed from two or more separate devices; and as such, may be distributed among a number of server, client, peer or other type nodes.

Like the host-application server 324, each of the remote devices 504-517 may be configured as a server, except such devices may carry out services different from the host-application server 324. The remote devices 504-517, however, need not be configured as servers, but rather, have the ability to service the host-application server 324.

The first endpoint device 504 may be configured as an application server, and may include memory ("first-endpoint memory") 556. The first-endpoint memory 556 may store source records obtained from the host-application server 324 using the File Transfer Protocol ("FTP").

The second endpoint device 506 may be configured with a messaging application. The messaging application may be capable of servicing requests and/or messages sent from the host-application server 324.

The service-database server 508 may be configured as a database server, and may be capable of servicing requests from the host-application server 324. The service-database server 508 may include a memory 558 for storing source database records transferred from the host-application server 324 along with target database records for transfer to the host-application server 324.

The service-FTP server 510 may be configured as a FTP server, and may be capable of servicing requests from the host-application server 324. The service-FTP server 510 may include a memory 560 for storing target-ftp files 562 for transfer to the host-application server 324.

The remote-message store 512 may be configured to hold (temporarily, permanently or for some other period of time) one or more messages. These messages may be retrieved and/or placed therein by one or more of the tasks of the workflow, another process (e.g., manual or automatic entry via a remote server, client, etc.), and/or another workflow.

In addition, the messages in the remote-message store 512 may include or be populated with one or more target messages and/or one or more source messages. The target messages are messages that may be exchanged between the remote-message store 512 and the content records 526 (via execution of the workflow). The source messages are messages that may be exchanged between the remote-message store 512 and the content records 526 and/or messaging software 570 (as described in more detail below).

The service-http server 514 may be configured as an HTTP server, and may be capable of servicing HTTP requests sent from the host-application server 324. The web server 516 may be configured to serve web services to the host-application server 324. The service-email server 517 may be configured as an email server, and may be capable of servicing email requests sent from the host-application server 324.

To not obscure the foregoing and following description with details and/or features of elements of the system 300 described above, some of these details and/or features are not repeated in the following description or shown in FIG. 5. Other details and/or features not described and/or not shown in FIG. 3 are presented.

The host 502 is similar to the host 306 of FIG. 3. Like the host 306, the host 502 includes the host-application server 324. The host 502 also includes a host-http server 564. The host-application server 324 may couple to and transact with the host-HTTP 564 while under the control of the workflow-application software 324 (e.g., under the control of the workflow-deployment module executing the workflow-executable code).

The host-http server 564 may include any processor-based platform that operates on any suitable operating system, such as Microsoft® Windows®, Linux and/or Symbian; and that is capable of executing software. Like the host-application server 324, the host-http server 564 may include a large number of elements; most of which are not shown in FIG. 5 for simplicity of exposition.

The elements of the host-http server 564 may be formed in a single unitary device and concentrated on a single server, client, peer or other type node. Alternatively, the elements of the host-http server 564 may be formed from two or more separate devices, and as such, may be distributed among a number of server, client, peer or other type node.

Although not shown, the host-HTTP server 564 may include a one or more processing units, memory, supports circuits, buses and other elements similar to the elements of the host-application server 324. The memory of the host-HTTP server 564 include an operating system, which may include and/or be embodied in various software and/or executable instructions or code for operating the host-HTTP server 564. The operating system, when executed by its processors, provide a platform on which the host-HTTP 564 server may execute software applications for servicing HTTP requests that emanate from and/or terminate to the host-application server 324.

The host-http server 564 may be configured as a server, and may assist the host-application server 324 for carrying out the execution of the workflow (as described in more detail below). The host-http server 564, however, needs not be configured as a server, but rather, be in any form that is operable to carry out services for the host-application server 324.

The memory 328 may also include various other software, such as messaging software 570, email software 572, FTP software 574, database software 574, etc., which may be configured to facilitate requests of the host-application server 324. Each of the messaging software 570, email software 572, FTP software 574 and database software 574 may operate as a client, peer and/or server.

The messaging software 570, when executed by the host-application server 324, provides an engine ("host-messaging engine") for exchanging one or more messages between the workflow-application software 338 and one or more of the remote devices, such as the remote-message store 512. The messaging engine may be capable of exchanging the messages using any messaging protocol, such as Java Messaging Service ("JMS"), Session Initiation Protocol ("SIP"), SIP for Instant Messaging and Presence Leveraging Extensions ("SIMPLE"), Application Exchange ("APEX"), Presence and Instant Messaging Protocol ("PRIM"), Extensible Messaging and Presence Protocol ("XMPP"), Instant Messaging and Presence Service ("IMPS"), Internet Message Access Protocol ("IMAP") and the like.

The email software 572, when executed by the host-application sever 324, provides the host-application server 324 with an engine ("host-email engine") for exchanging one or more email messages (with or without attachments) with the service-email server 517, and for transferring such email messages to and from the memory 328. The email engine may be capable of interfacing with service-email server 518 according to any version of Simple Mail Transport Protocol ("SMTP"), Post Office Protocol ("POP"), Internet Message Access Protocol ("IMAP"), and other email service types.

The FTP software 574, when executed by the host-application sever 324, provides the host-application server 324 with an engine ("host-FTP engine"). This FTP engine may carry out, in accordance with FTP, one or more transfers of files between one or more remote devices, such as the service-FTP server 510 and the memory 328.

The database software 576, when executed by the host-application sever 324, provides the host-application server 324 with an interface ("host-database interface") for exchanging one or more database records from one or more remote devices, such as the service-database server 508, and for transferring such database records to and from the memory 328. The database software 576 may be, for example, a client interface, such as a Java Database Connectivity ("JDBC") API, a Root Database Connectivity ("RDBC") API and the like. This client interface may be operable to interface to any of an Oracle, DB2, Microsoft Access, Microsoft SQL Server, MySQL, 4th Dimension, FileMaker and the like database applications. In any case, the database software 576 may be capable of interfacing with any number of databases including those formed using a Oracle, DB2, Microsoft Access, Microsoft SQL Server, MySQL, 4th Dimension, FileMaker, etc. database application.

The memory 328 may include, in addition to above, a number of records or other data structures (collectively, "records"). The records may be used by and/or obtained for use by one or more of the tasks during an execution of the workflow. Examples of the records include messages records 518, template records 520, service-definition records 522, content records 526 and recorded-workflow records 556.

The message records 518 may include a repository ("message repository"), which may be configured to hold one or more messages for retrieval by one or more of the tasks of the workflow. The message repository, for example, may include one or more messages ("source messages") for transfer or retrieval from the host-application server 324 and/or one or more messages ("target messages") transfer to or retrieved by the host-application server 324.

The template records 520 may include one or more conversion templates, schema templates, validation templates and/or message templates. As described in more detail below, the conversion templates may be used by the tasks to convert input information from a native format into another format. To facilitate this, the conversion templates may include one or more conversion filters. Examples of such conversion filters include a Microsoft® Excel® ("XLS") to XML filter, a delimited-field format to XML filter, a fixed-length field format to XML filter, a XML to XLS filter, an XML to a delimited-field format filter, a XML to a fixed-length field filter, etc.

The schema templates may be used by one or more of the tasks of the workflow for identifying, evaluating and/or validating whether certain input information or results output from such tasks conform to one or more schemas and/or one or more semantic protocols. Examples of the schemas and/or semantic protocols may include: XML; Financial Information eXchange ("FIX") protocol; customized versions of the FIX protocol, standards promulgated by the Society for Worldwide Interbank Financial Telecommunication SCRL ("SWIFT"); Financial products Markup Language ("FpML") protocol; Simple Object Access Protocol or Service Oriented Architecture Protocol (collectively, "SOAP"); and the like.

In addition, the validation templates (as described in more detail below) may include one or more expressions and/or one or more mappings that may be used by one or more of the tasks for evaluation of correctness and/or appropriateness of content input into such tasks. The expressions and/or mappings may be used to create a series of rules that form a function for determining if the content input into the tasks is valid (e.g., the content conforms to expected criteria).

The message templates may be configured as stencil-type templates (e.g., mail merge templates), which may be used by one or more of the tasks for parsing the input information. The message templates may include one or more entries into which the input information may be parsed. The entries may also be populated with expressions (e.g., formulas) that may be evaluated using the input information. The message templates may be used by one or more of the tasks to programmatically generate any number of records. For example, the message templates may be used by the tasks to generate web pages, company newsletters and the like.

The content records 526 may include content for input into the task; results generated from execution of the tasks; one or more expressions (e.g., formulas, procedures, rules, etc) for evaluation by one or more of the tasks; the tasks' parameters; one or more variables for use with the expressions and/or the tasks' parameters; email records; and other information used, processed and/or stored by the tasks.

Each of the email records may include (i) a first field that may be populated with an email address assigned to or otherwise associated with a sender of a email message, (ii) a second field that may be populated with an email address assigned to or otherwise associated with a recipient of the email message, (iii) a third field that may be populated with a subject of the email message, (iv) a fourth field that may be populated with a body of the email message, and/or (v) information for retrieving or otherwise obtaining any attachment to the email message, if any.

The recorded-workflow file 556 may include one or more records ("recorded-workflow records") for carrying out a previously recorded workflow ("recorded workflow"). These recorded-workflow records may include information for accessing the content records 526 so as to (i) obtain input information for execution of the recorded workflow, and/or (ii) store in the content records 526 any results from execution of the recorded workflow.

GUI Display Screen Example

Figure 6:
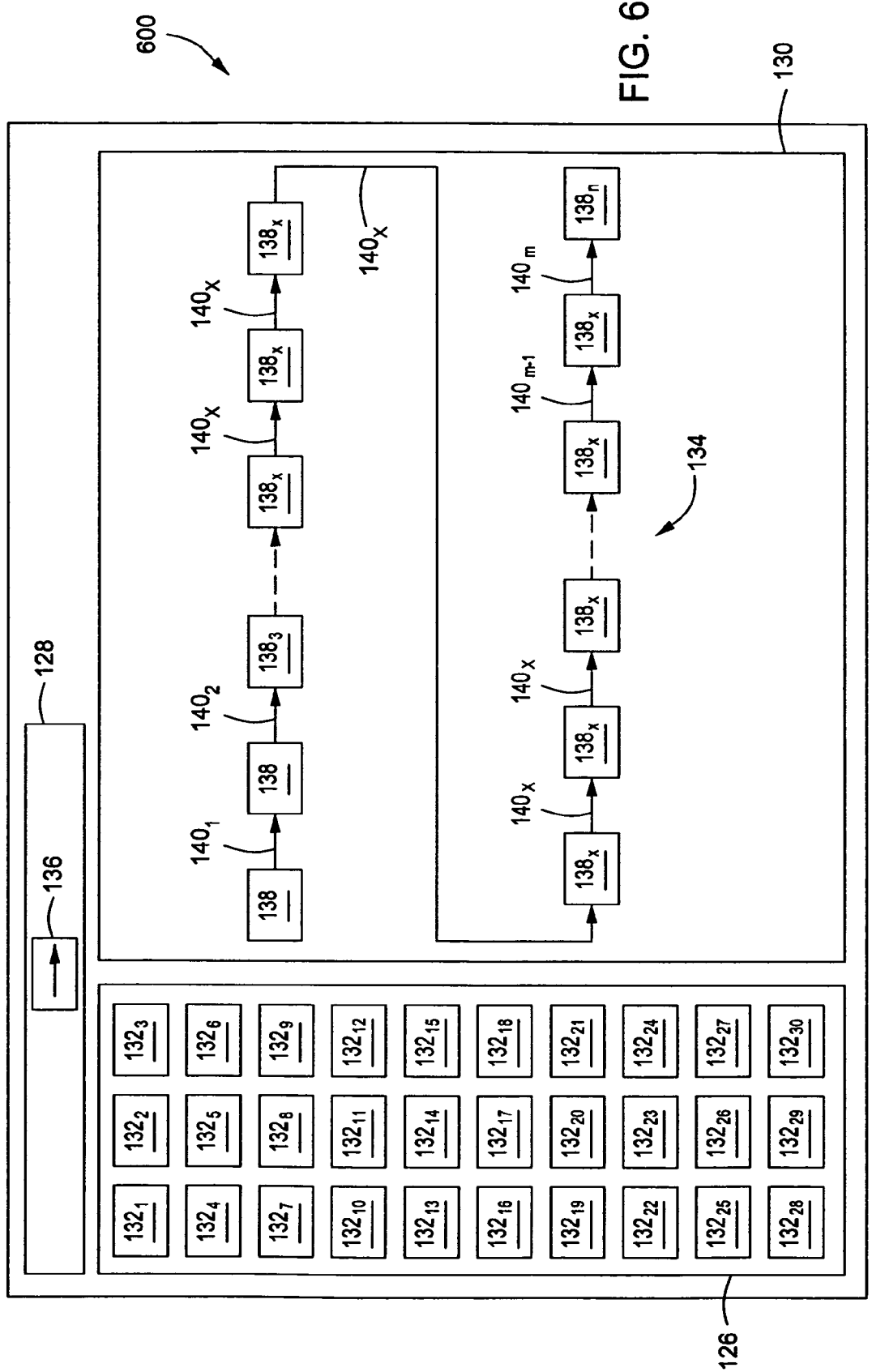
FIG. 6 is a graphical diagram illustrating an example of a display screen of a graphical-user interface for use with facilitating a generation, deployment and/or execution of a workflow.

FIG. 6 is a graphical diagram illustrating an example of a display screen 600 of a graphical-user interface. The display screen 600 is similar to the display screen 124 of FIG. 5, except as described herein. For convenience, the display screen 600 is described with reference to the system 500 of FIG. 5. The display screen 600, however, may be rendered using other architectures as well.

The display screen 600 includes the widget pane 126, the widget toolbar 128 and the workflow pane 130. The widget pane 126 includes a start widget $132_1$, a stop widget $132_2$, a display widget $132_3$, a conditional-statement widget $132_4$, a parse-template widget $132_5$, an expression widget $132_6$, a send-email widget $132_7$, a get-ftp widget $132_8$, a send-ftp widget $132_9$, a get-dB widget $132_{10}$, a send-dB widget $132_{11}$, a http-listen widget $132_{12}$, a http-send widget $132_{13}$, a http-respond widget $132_{14}$, a get-MQ widget $132_{15}$, a send-MQ widget $132_{16}$, a web-service widget $132_{17}$, a transform widget $132_{18}$, a convert widget $132_{19}$, a semantic-protocol widget $132_{20}$, a delete widget $132_{21}$, a validate widget $132_{22}$, a tcp-listen widget $132_{23}$, a tcp-get widget $132_{24}$, a tcp-send widget $132_{25}$, a wait widget $132_{26}$, a get-email widget $132_{27}$, a copy widget $132_{28}$, an iterate widget $132_{29}$, and a launch-workflow widget $132_{30}$.

These widgets $132_1$-$132_{30}$ correspond to start, stop, display, conditional-statement, parse-template, expression, send-email, get-ftp, send-ftp, get-dB, send-dB, http-listen, http-send, http-respond, get-MQ, send-MQ, web-service, transform, convert, semantic-protocol, delete, validate, tcp-listen, tcp-get, tcp-send, wait, get-email, copy, iterate and launch-workflow tasks (collectively, "tasks") and are associated with workflow-operation records $116_1$-$116_{30}$, respectively. The workflow-operation records $116_1$-$116_{30}$, in turn, include the respective task's parameters.

As described above, the GUI software 110 may obtain, for each instance of the widgets $132_1$-$132_{30}$ in the graphical workflow 134, the corresponding task's parameters via manipulation of the GUI by the I/O device 106 (e.g., entered via a keyboard). The workflow-application software 338 may obtain such tasks' parameters from the workflow record 114 dispatched from the GUI software 110, and may use these tasks' parameters to execute the workflow. The following describes, with respect to each of the widgets $132_1$-$132_{30}$, (i) the task that the workflow-application software 338 may execute if such task were to be included in the workflow (and graphical workflow 134), and (ii) examples of the task's parameters with respect to executing the workflow and provisioning the host 502 for executing the workflow.

Start Task Example

The start task, as represented by the start widget $132_1$, functions as a starting point for executing the workflow, and causes host-application server 324 to begin carrying out the tasks of the workflow. Typically, the workflow includes only one start task.

Some of start task's parameters may be common to other tasks and/or the workflow as a whole. The common start task's parameters may include a workflow-name entry, a workflow-description entry, a workflow-author entry, a workflow-version entry and a log-level entry.

The workflow-name entry may include a name given to the workflow to identify the workflow. The workflow-description entry may be populated with a description given of the workflow to describe, for example, a purpose for the workflow. The workflow-author entry may be populated with a name of an author that authors the workflow. The workflow-version entry may be populated with an indicator (e.g., a number) to indicate a version assigned to the workflow. Each of the workflow-name, workflow-description, workflow-author and workflow-version entries may be expressed as a character or a string of characters.

The log-level entry may be populated with an indicator that indicates a level (e.g., an error, warning or debug level) for triggering a logging of events during execution of the workflow. The log-level entry may be expressed as one of a given number of settings.

For each of the following tasks, the tasks' parameters may include respective name entries and description entries. Except as otherwise described, each of the name entries may include a name assigned to the corresponding task so to identify a particular instance of it, and may be expressed as a character, a string of characters, a variable, an expression, etc.

In addition, each of the description entries may include a description assigned to the corresponding task for describing a particular instance of the corresponding task. These description entries may be expressed as a character, a string of characters, a variable, an expression; etc. Other tasks' parameters are described in more detail below.

Stop Task Example

The stop task, as represented by the stop widget $132_2$, functions as an ending point or termination of the workflow, and causes the host-application server 324 to terminate the workflow. The stop task's definitions may include termination parameters. The termination parameters may include a setting for indicating either a normal or abnormal termination of the workflow ("termination setting"), and a flag for indicating that the any input information that undergoes processing by the workflow is considered either fully processed by the workflow or not.

The workflow may include more than one stop task, when, for example, the workflow includes more than one alternative path of execution or "branch" of tasks ("workflow branches"). By way of example, the workflow branches may include first and second branches. The first branch may terminate with a first stop task, and the second branch may terminate with a second stop task. In this case, the GUI software 110 may configure the first and second stop tasks' parameters by setting the termination settings of both the first and second stop tasks to normal terminations so as to cause the workflow to terminate respective workflow branches only. When so configured, the GUI software 110 may set the flag so as to indicate that the input information that undergoes processing by the tasks of the first and second branches are considered fully processed.

Alternatively, the GUI software 110 may configure either or both of the first and second stop tasks' parameters by setting the termination settings to abnormal termination so as to cause the workflow to terminate upon performing either the first or second stop tasks. When so configured, the GUI software 110 may set the flag to indicate that the input information undergoing processing by the workflow are not considered fully processed.

Display Task Example

The display task, as represented by the display widget $132_3$, causes the host-application server 324 to send, via the host-messaging engine, a message to the message records 518 for retrieval and/or to the second endpoint device 506. This message the in message records 518 may be retrieved by other tasks, another workflow, the user device 302, the host 306, and/or the second endpoint device 506, etc.

Examples of display task's parameters may include a message-queue entry and a message entry. The message-queue entry may include information for accessing and/or communicating with the message records 518 and/or the second endpoint device 506 to deliver the message. This information may be, for example, a name or address assigned to or otherwise associated with message records 518 and/or the second endpoint device 506. Alternatively, the information may be a reference, pointer, uniform-resource identifier ("URI") or other indicator to a location of the message records 518 in the memory 328 and/or to name or address of the second endpoint device 506.

The message entry may include (i) a first field that may be populated with a subject of the message ("the message subject") and (ii) a second field that may be populated with a body or content of the message ("the message body"). The message-queue and message entries may be expressed as may be expressed as characters, strings of characters, expressions, templates, variables and/or the like. In addition, the message body may be specified using the messaging template noted above.

Conditional-Statement Task Example

The conditional-statement task, as represented by conditional-statement widget $132_4$, functions as decision point for causing the host-application server 324 to execute one or more of the workflow branches as a function of a conditional statement. The conditional-statement task's parameters may include a conditional-expression entry.

The conditional-expression entry may be populated with the conditional statement. The conditional statement may be expressed as a logical expression, such as an if-then statement and/or a BOOLEAN expression, and may specify one or more of the workflow branches and/or tasks for execution upon an evaluation (e.g., a true or false determination) of the conditional statement.

Parse-Template Task Example

The parse-template task, as represented by the parse-template widget $132_5$, causes the host-application server 324 to select a template ("selected template") from the message templates, parse at least a portion of its input information with the selected template. To parse the input information, the host-application server 324 may (i) populate the variables in the selected template with the input information that corresponds thereto, (ii) evaluate the expressions specified in the selected template so as to form a result, and (iii) output and/or store the result in the content records 526.

The parse-template task's parameters may include a template entry. The template entry may be expressed may be expressed as characters, strings of characters, expressions, templates, variables and/or the like.

The template entry may include information for retrieving or otherwise obtaining the selected template for parsing the input information. This information may be, for example, a name assigned to or otherwise associated with the selected template. Alternatively, the information may be a reference, pointer, URI or other indicator to a location of the selected template stored in the template records 520 on the memory 328.

Expression Task Example

The expression task, as represented by the expression widget $132_6$, may cause the host-application server 324 to evaluate one or more of the expressions specified in the expression's task's parameters, and store one or more results of the evaluation in the content records 526 for subsequent retrieval and/or analysis. The expression task may cause the host-application server 324 to apply an order execution when the expression entry includes more than one expression. This order of execution may be based on time of entry, order of entry, mathematical hierarchy, analytical hierarchy, arithmetical hierarchy, statistical analysis, etc.

Examples of expression task's parameters may include an expression entry and a result-location entry. The expression entry may include one or more expressions (e.g., formulas). The result-location entry may include information for retrieving or otherwise obtaining from the content records 526 a previously stored result, and for storing a current result back to the content records 526. This information may be, for example, a name assigned to or otherwise associated with the current results in the content records 526 and/or the previously stored result stored in the content records 526. Alternatively, the information for the result-location entry may be a reference, pointer, URI or other indicator of a location (i) of the content records 526, (ii) of the previously stored result stored in the content record 526 and/or (iii) for storing the current result in the content records 526. The result-location entry may be expressed as characters, strings of characters, expressions, templates, variables and/or the like.

Send-Email Task Example

The send-email task, as represented by the send-email widget $132_7$, may cause the host-application server 324 to create an email message (with or without attachment) and transmit it, via the email software 572 and/or the service-email server 517, to at least one recipient, such the second endpoint device 506. Examples of send-email task's parameters may include an email-service-definition entry and an email entry.

The email-service-definition entry may include a reference to a previously configured service definition that identifies an email service ("email-service definition") that may be used to carry out the send-email task. The email-service definition may include a number of parameters ("email-service parameters"), which may be stored on the memory 338 in service-definition records 522. The email-service parameters may include information for configuring the email software 572 and/or the service-email server 517 to carry out the send-email task. This information may include, for example, URIs and/or other addresses of the email software 572 and/or the service-email server 517, protocols to be used for carrying out the email service, and the like.

The email entry may include information for populating the email. This information may be expressed as a character, sets of characters and/or variables. As an alternative, the information for the email entry may be expressed as expressions; the evaluation of which determines the contents of the email. In either case, the information for the email entry may include, for example, names assigned to or otherwise associated with one or more portions of the email, which may be obtained from the email records stored in the content records 526. Alternatively, the information for the email entry may be a reference, pointer, URI or other indicator to locations of the email records stored in the content records 526 the email.

Although the email-service definition and associated email-service parameters are described herein as being included in the service definition records 522, the service definition records 522 may be dispensed with. If dispensed with, the send-email task's parameters may include information analogous to the email-service definition and associated email-service parameters for configuring the email service.

Get-FTP Task Example

The get-ftp task, as represented by the get-ftp widget $132_8$, may cause the host-application server 324 to retrieve a file ("target-ftp file") from the service-FTP server 508 via the host-FTP engine, and store the target-ftp file to the memory 328. Examples of get-ftp task's parameters may include a get-ftp-service-definition entry, a target file entry, a destination-location entry, and a get-additional-files entry. The get-ftp-service-definition, target file, destination-location and get-additional-files entries may be expressed as characters, strings of characters, expressions, templates, variables and/or the like.

The get-ftp-service-definition entry may include a reference to a previously configured service definition that identifies an FTP service that may be used to carry out the get-ftp task. This service definition ("FTP-service definition") may include a number of parameters, which may be stored on the memory 338 in the service-definition record 522. These parameters ("FTP-service parameters") may include information for configuring the FTP software 574 and/or the service-FTP server 510 to carry out the get-ftp task. This information may include, for example, a name or address assigned to or otherwise associated with the service-FTP server 508; a setting for specifying a type of transfer mode (e.g., ASCII or binary) to be used; and the like.

The target file entry may include information for retrieving or otherwise obtaining the target-ftp file from the service-FTP server 508 using the FTP-service. This information may include a name or address assigned to or otherwise associated with the target-ftp file. Alternatively, the information for the target file entry may be a reference, pointer, URI or other indicator to a location of the target-ftp file on the service-FTP memory 560.

The destination-location entry may include information for indicating where to store the target-ftp file on the memory 328. This information may include, for example, a reference, pointer, URI or other indicator to a location of the on the memory 328.

The get-additional-files entry may include a setting for specifying whether or not to retrieve more than one file from the service-FTP memory 560. Although the destination-location entry and get-additional-files entry are described herein as being included in the get-ftp task's parameters, either or both of such entries (and the parameters included therein) may be included as FTP-service parameters in the FTP-service definition instead of in the get-ftp task's parameters. In such case, the get-ftp task's parameters may optionally include parameters for overriding, modifying, adjusting or otherwise changing such FTP-service parameters. As another alternative, the information in or information analogous to the FTP-service definition and associated FTP-service parameters may be included in the get-ftp task's parameters instead of the service definition records 522.

Send-FTP Task Example

The send-ftp task, as represented by the send-ftp widget $132_9$, may cause the host-application server 324 to transfer a file ("source-ftp file") from memory 328 to the service-device memory 556 of the first-endpoint device 504 using the FTP software 574. Examples of send-ftp task's parameters may include a send-ftp-service-definition entry, a source file entry, a destination-location entry, and a send-additional-files entry.

The send-ftp-service-definition entry may include a reference to a previously configured FTP service definition that may be used to carry out the send-ftp task. This FTP-service definition may include a number of parameters, which may be stored on the memory 338 in the service-definition record 522. These parameters ("FTP-service parameters") may include information for configuring the FTP software 574 and/or the first-endpoint device 504 to carry out the send-ftp task. This information may include, for example, a name or address assigned to or otherwise associated with the FTP software 574 and/or the first-endpoint device 504; a setting for specifying a type of transfer mode (e.g., ASCII or binary) to be used; and the like.

The source file entry may include information for retrieving or otherwise obtaining the source-ftp file from the memory 328. This information may include a name or address assigned to or otherwise associated with the source-ftp file. Alternatively, the information for the source file entry may be a reference, pointer, URI or other indicator to a location of the source-ftp file on the memory 328.

The destination-location entry may include information for storing the source-ftp file on the service-device memory 556. This information may be, for example, a reference, pointer, URI or other indicator to a location of the service-device memory 556 and/or the first-endpoint device 504.

The send-additional-files entry may include a setting for specifying whether or not to transfer more than one file on the service-device memory 556 of first-endpoint device 504. The send-ftp-service-definition, source file, destination-location and send-additional-files entries may be expressed as characters, strings of characters, expressions, templates, variables and/or the like.

Although the destination-location entry and send-additional-files entry are described herein as being included in the send-ftp task's parameters, either or both of such entries (and the parameters included therein) may be included as FTP-service parameters in the FTP-service definition instead of in the send-ftp task's parameters. In such case, the send-ftp task's parameters may optionally include parameters for overriding, modifying, adjusting or otherwise changing such FTP-service parameters. As another alternative, the information in or information analogous to the FTP-service definition and associated FTP-service parameters may be included in the get-ftp task's parameters instead of the service definition records 522.

Get-Database Task Example

The get-dB task, as represented by the get-dB widget $132_{10}$, may cause the host-application server 324 to retrieve or otherwise obtain target data from the target records in memory 558 of the service-database server 508, and to store such target data in the content record 526. The get-dB task may cause such transfer of the target data responsive to the host-application server 324 submitting a query (e.g., one or more SQL commands) to the service-database server 508.

Examples of get-dB task's parameters may include a get-dB-service-definition entry, a data request entry and a destination-location entry. The get-dB-service-definition, data request and destination-location entries may be expressed as characters, strings of characters, expressions, templates, variables and/or the like.

The get-dB-service-definition entry may include a reference to a previously configured service definition that identifies a database service that may be used to carry out the get-dB task ("dB-service definition"). This dB-service definition may include a number of parameters, which may be stored on the memory 338 in the service-definition record 522. These parameters ("dB-service parameters") may include information for configuring the database software 576 and/or the service-database server 508 to carry out the get-dB task. This information may include, for example, names or addresses assigned to or otherwise associated with the database software 576 and/or the service-database server 508; one or more settings for specifying at least one database management systems ("DBMS"), such as any of a Oracle, DB2, Microsoft Access, Microsoft SQL Server, Postgres, MySQL, 4th Dimension, FileMaker and Alpha Five DBMS, for querying the service-database server 508; and the like.

The information for the dB-service parameters may also include a name, address, reference, pointer, URI or other indicator to a location of the source records in memory 558 of the service-dB server 508. The information for the dB-service parameters may further include a reference to a template or schema into which the target data may be parsed, transformed, converted and/or validated before transfer to the content records 526.

This template or schema may, for example, define an XML sequence of elements. An example of such elements is as follows:

```
<rowset>
    <row>
        <Column1Name></Column1Name>
        <Column2Name></Column2Name>
        ...
        <ColumnNName></ColumnNName>
    </row>
</rowset>
```

The <row> pair demarcates <$column_1$-$column_n$> pairs, and may correspond, for example, to a row of the source data stored in the source-database records or a row of the target data stored in the service-database server 508. The <$column_1$-$column_n$> pairs demarcate a respective number of placeholders. These placeholders may be parsed with the content that corresponds to respective columns of the row of source data.

Although the foregoing example includes only one <row> pair, the XML sequence, however, may include more than one <row> pair. These additional <row> pairs may demarcate one or more additional <column> pairs. In addition, the foregoing example includes more than one column pair, namely, <$column_1$-$column_n$>. The XML sequence, however, may include only one column pair.

The data request entry may include information for causing the database software 576 to generate a query for execution against the source records in memory 558 of the service-database server 508 so as to obtain the target data from the target records in memory 558 of the service-database server 508. The destination-location entry may include information for storing the target data in the variables records 526. This information may include a name, address, reference, pointer, URI or other indicator to a location of the content records 526.

Although the destination-location entry is described herein as being included in the get-dB task's parameters, this entry (and the parameters included therein) may be included as dB-service parameters in the dB-service definition instead of in the get-dB task's parameters. In such case, the get-dB task's parameters may optionally include parameters for overriding, modifying, adjusting or otherwise changing such dB-service parameters. As another alternative, the information in or information analogous to the dB-service definition and associated dB-service parameters may be included in the get-dB task's parameters instead of the service definition records 522.

Send-Database Task Example

The send-dB task, as represented by the send-dB widget $132_{11}$, may cause the host-application server 324 to perform one or more operations with the service database server 508 so as to insert, update, delete, retrieve or otherwise modify data or a schema on the service-database server 508. For example, the send-dB task may cause the host-application server 324 to transfer source data obtained from the content records 526 to the service-database server 508 via the database software 576. Alternatively, the send-dB task may cause the database software 576 to (i) execute a query against the content records 526 to obtain the source data, and (ii) transfer the source data to the service-database server 508.

Examples of send-dB task's parameters may include a send-dB-service-definition entry and a database operation entry. Each of the send-dB-service-definition and database operation entry may be expressed as a character, a string of characters, an expression, a template and/or a variable.

The send-dB-service-definition entry may include a reference to a previously configured dB-service definition for carrying out the send-dB task. This information may include, for example, names or addresses assigned to or otherwise associated with the database software 576 and/or the service-database server 508; one or more settings for specifying at least one DBMS for interfacing with the service-database server 508; one or more settings for specifying at least one DBMS for querying the content records 526; and the like.

The information for the dB-service parameters may also include a name, address, reference, pointer, URI or other indicator to a location in the target records of memory 558 of the service-database server 508 for storing the source data. The information for the dB-service parameters may also include a reference to a template or schema (e.g., an XML sequence) into which the source data may be parsed before transfer to the target records of memory 558 of the service-database server 508.

The database operation entry may include information inserting, updating, deleting, retrieving or otherwise modifying the data and/or schema of the service-database server 508 (e.g., information for causing the database software 576 to generate a query for execution by the database software 576. Alternatively, the database operation entry may include a name, address, reference, pointer, URI or other indicator to a location of the source data in the content records 526.

To facilitate providing the source data to the service-database server 508, the send-dB task may cause the host-application server 324 to parse the source data in accordance with semantics, such as replace-type semantics. For example, the send-dB task may cause the host-application server 324 to update <row> elements of the target data in memory 558 of the service-database server 508 with the source data that corresponds to such <row> elements. On the other hand, the send-dB task may cause the host-application server 324 to insert <row> elements for such source data when the target data in memory 558 of the service-database server 508 does not include such <row> elements.

As an alternative, the information in or information analogous to the dB-service definition and associated dB-service parameters may be included in the send-dB task's parameters instead of the service definition records 522.

HTTP-Listen Task Example

The http-listen task, as represented by the http-listen widget $132_{12}$, may cause the host-HTTP server 564 to (i) listen for a given service-HTTP request from one or more applications of a service device, such as a web browser of the second endpoint device 506; (ii) establish a communication between the host-HTTP server 564 and the application of the second endpoint device 506 responsive to the given service-HTTP request, and (iii) cause the host-application server 324 to execute a given set of the tasks ("given-task set") selected from one or more sets of the tasks queued for execution ("queued-task sets").

The http-listen task may also cause the host-application server 324 to extract information from the given service-HTTP request and/or the communication between the host-HTTP server 564 and the application of the second endpoint device 506 (collectively "HTTP-connection details"). The http-listen task may use the HTTP-connection details for selecting the given-task set from the queued-task sets and for carrying out the given-task set.

Examples of the http-listen task's parameters may include an http-listen-service-definition entry and a destination-location entry. The http-listen-service-definition entry and the destination-location entry may be expressed as characters, strings of characters, expressions, templates, variables and/or the like.

The http-listen-service-definition entry may include a reference to a previously configured service definition that identifies a service that may be used to carry out the http-listen task ("HTTP-service definition"). This HTTP-service definition may include a number of parameters, which may be stored on the memory 338 in the service-definition record 522. These parameters ("HTTP-service parameters") may include information designating an internet protocol ("IP") address and a port of host-HTTP server 564 for listening for the request. This information may include, for example, a URI associated with the domain of the service-HTTP server 514. This URI may be full or partial. The URI may be prefixed with the IP and/or name of the service-HTTP server 514 that is assigned by a domain-name server ("DNS"). The information for the http-service definition may also include (i) one or more IP addresses associated with the service-HTTP server 514; and (ii) information for designating the applications and/or service devices that the http-listen task listens for.

The destination-location entry may include information for storing the HTTP-connection details in the content records 526. This information may include, for example, a name, address, reference, pointer, URI or other indicator to a location of the content records 526.

HTTP-Send Task Example

The http-send task, as represented by the http-send widget $132_{13}$, may cause the host-application server 324 to (i) send a given HTTP request to the service-HTTP server 514, (ii) establish a communication between the host-HTTP server 564 and the service-HTTP server 514, (iii) receive a HTTP reply from the service-HTTP server 514, and (iv) store content associated with the HTTP reply in the content records 526. Examples of the http-send task's parameters may include an http-send-service-definition entry and an http-send-operation entry. Each of the http-send-service-definition and http-send-operation entries may be expressed as a character, string of characters, expression, template, variable and/or the like.

The http-send-service-definition entry may include a reference to a previously configured HTTP-service definition. This HTTP-service definition may include a number of HTTP-service parameters, which may be stored on the memory 338 in the service-definition record 522. As an alternative, the information in or information analogous to the HTTP-service definition and associated parameters ("HTTP-service parameters") may be included in the http-send task's parameters instead of the service definition records 522. The HTTP-service parameters may include information designating an IP address and/or a port of the service-HTTP server 514 configured to receive the given host-HTTP request.

The http-send-operation entry may include (i) a URL (full or partial) associated with the domain of the service-HTTP server 514, which may be prefixed with the IP and/or name of the service-HTTP server 514 that is assigned by a DNS; (ii) information for indicating to the service-HTTP server 514 a method of transfer, e.g., a HTTP GET, POST and/or PUT; (iii) information for retrieving and/or obtaining from the content records 526 source data (e.g., variables, expressions and/or templates) for generating the given HTTP request; (iv) information for storing the content associated with the communication in the message channels for subsequent retrieval; and (v) information for storing the content associated with the HTTP reply in the content records 526.

Although the http-send-operation entry is described herein as being included in the HTTP-send task's parameters, this entry (and the parameters included therein) may be included as HTTP-service parameters in the HTTP-service definition instead of in the HTTP-send task's parameters. In such case, the HTTP-send task's parameters may optionally include parameters for overriding, modifying, adjusting or otherwise changing such HTTP-service parameters. As another alternative, the information in or information analogous to the HTTP-service definition and associated HTTP-service parameters may be included in the HTTP-send task's parameters instead of the service definition records 522.

HTTP-Respond Task Example

The http-respond task, as represented by the http-respond widget $132_{14}$, may cause the host-HTTP server 564 to issue a given host-HTTP reply to a given service-HTTP request issued from one or more applications of a service device, such as the web browser of the second endpoint device 506. This may include causing the host-HTTP server 564 to (i) obtain content from the content records 526 for inclusion in the given host-HTTP reply, and (ii) send the content to the service-HTTP server 514. The content included in the given host-HTTP reply may be selected from information stored in the content records 526 or, alternatively, constructed from such information as a function of an expression, template, etc.

Examples of the http-respond task's parameters may include an http-connection-definition entry and a source file entry. Each of the http-connection-definition and source file entries may be expressed as a character, a string of characters, an expression, a template and/or a variable.

The http-connection-definition entry may include a reference to HTTP-connection details stored on the memory 338 in the content records 526. The HTTP-connection details may include, as noted above, information for designating an IP address and a port of the web browser of the second endpoint device 506 to receive the given host-HTTP reply.

The source file entry may include information for obtaining the content from the content records 526. This information may include a name or address assigned to or otherwise associated with the content in the content records 526. Alternatively, the information may include a reference, pointer, URI or other indicator to a location of the content in the content records 526.

Get-Message-Queue Task Example

The get-MQ task, as represented by the get-MQ widget $132_{15}$, may cause the host-application server 324 to retrieve and transfer a message ("target message") from the remote message queue 512 to the content records 526 via the messaging software 570. Examples of the get-MQ task's parameters may include a get-MQ-service-definition entry, a target-message entry and a destination-location entry. The get-MQ-service-definition, get-message and destination-location entries may be expressed as characters, strings of characters, expressions, templates, variables and/or the like.

The get-MQ-service-definition entry may include a reference to a previously configured service definition that identifies a message-queue service that may be used to carry out the get-MQ task. This service definition ("MQ-service definition") may include a number of parameters, which may be stored on the memory 338 in the service-definition record 522. These parameters ("MQ-service parameters") may include information for configuring the messaging software 570 and/or the remote-message store 512 to carry out the get-MQ task. This information may include, for example, a URI associated with the domain of the remote-message store 512; and/or one or more IP addresses associated with the remote-message store 512.

The target message entry may include information for differentiating the target message from other messages in the remote-message store 512. This information may include, for example, terms for searching and monitoring the remote-message store 512 for the target message.

The destination-location entry may include information for storing the target message in the content records 526. This information may include, for example, a name, address, reference, pointer, URI or other indicator to a location of content records 526.

Although the destination-location entry is described herein as being included in the get-MQ task's parameters, this entry (and the parameters included therein) may be included as MQ-service parameters in the MQ-service definition instead of in the get-dB task's parameters. In such case, the get-MQ task's parameters may optionally include parameters for overriding, modifying, adjusting or otherwise changing such MQ-service parameters.

As another alternative, the information in or information analogous to the MQ-service definition and associated MQ-service parameters may be included in the get-MQ task's parameters instead of the service definition records 522.

Send-Message-Queue Task Example

The send-MQ task, as represented by the send-MQ widget $132_{16}$, may cause the host-application server 324 to obtain content from the content records 526; populate one or more of the source messages with the content obtained from the content records 526; and transfer the source messages to the remote message queue 512, via the messaging software 570. The content obtained from the content records 526 may be selected from information stored in the content records 526 or, alternatively, constructed from such information as a function of an expression, template, etc.

Examples of the send-MQ task's parameters may include a send-MQ-service-definition entry and a message entry. The send-MQ-service-definition entry and the message entry may be expressed as characters, strings of characters, expressions, templates, variables and/or the like.

The send-MQ-service-definition entry may include a reference to a previously configured MQ-service definition that may be used to carry out the send-MQ task. This MQ-service definition may include a number of MQ-service parameters, which may be stored on the memory 338 in the service-definition record 522. These MQ-service parameters may include information for configuring the messaging software 570 and/or the remote message queue 512 to carry out the send-MQ task. This information may include, for example, the URI associated with the domain of the remote message queue 512, or alternatively, one or more IP addresses associated with the remote message queue 512.

The MQ-service parameters may also include information for obtaining the content from the content records 526. This information may include a name or address assigned to or otherwise associated with information stored in the content records 526. Alternatively, the information may include a reference, pointer, URI or other indicator to a location of such information in the content records 526. In addition, the MQ-service parameters may include terms and/or instructions for constructing the content from information stored in the content records 526.

The message entry may include (i) a first field that may be populated with a subject of the message and (ii) a second field that may be populated with a body of the message. The message entry may include other fields as well.

Although the MQ-service definition and associated MQ-service parameters are described herein as being included in the service definition records 522, the MQ-service definition and the parameters included therein may be dispensed with. If dispensed with, the send-MQ task's parameters may include information for configuring the MQ service.

Web-Service Task Example

The web-service task, as represented by the web-service widget $132_{17}$, may cause the host-application server 324 to (i) obtain content from the variables records 526, and (ii) transfer the content to trigger execution of a web service on the remote-web server 516. The web-service task may also cause the host-application server 324 to store in one of the content records 526 any results returned from the web service. The content obtained from the content records 526 may be selected from information stored in the content records 526 or, alternatively, constructed from such information as a function of an expression, template, etc.

Examples of the web-service task's parameters may include a web-service-definition entry and a content entry. The web-service-definition entry and content entry may be expressed as characters, strings of characters, expressions, templates, variables and/or the like.

The web-service-definition entry may include a reference to a previously configured service definition that identifies a service for carrying out the web-service task. This service definition ("web-service definition") may include a number of parameters, which may be stored on the memory 338 in the service-definition record 522. These parameters ("web-service parameters") may include information for configuring the host-application server 324 and/or the remote-web server 516 to carry out the web-service task. The configuration information may include, for example, information for carrying out transfers of the input information between the host-application server 324 and other devices, such as the web server 516, such as IP addresses, parameters, type of data, key value pairs, posting of images, etc.

The web-service parameters may also include information for selecting the web-service from a set of web services offered by the remote-web server 516; and/or information for designating a method of execution of the web-service. The web-service parameters may further include information for storing the results, if any, in the content records 526. Such information may include a name, address, reference, pointer, URI or other indicator to a location in the content records 526.

The content entry may include the information for obtaining the content from the content records 526. This information may include a name or address assigned to or otherwise associated with the content in the content records 526. Alternatively, the information may include a reference, pointer, URI or other indicator to a location of the content in the content records 526.

Although the web-service definition and associated web-service parameters are described herein as being included in the service definition records 522, the web-service definition and the parameters included therein may be dispensed with. If dispensed with, the web-service task's parameters may include information for configuring the web service.

Transform Task Example

The transform task, as represented by the transform widget $132_{18}$, may cause the host-application server 324 to (i) obtain content from the content records 526, (ii) apply a transform against the content to yield results, and (iii) transfer the results to the content records 526. Examples of the transform task's parameters may include a transform entry, a content entry and a destination-location entry. The transform, content and destination-location entries may be expressed as characters, strings of characters, expressions, templates, variables and/or the like.

The transform entry may include information for retrieving or otherwise obtaining from the content records 526 a transform for transforming (e.g., rearranging and/or changing the structure of) the content. This information may include a reference to the transform. The reference may refer to one of a number of transforms stored in the content records 526. The content entry may include information for obtaining the content from the content records 526. This information may include a name or address assigned to or otherwise associated with the content in the content records 526. Alternatively, the information may include a reference, pointer, URI or other indicator to a location of the content in the content records 526.

The destination-location entry may include information for storing the results to the content records 526. Such information may include a name, address, reference, pointer, URI or other indicator to a location in the content records 526.

Conversion Task Example

The conversion task, as represented by the transform widget $132_{19}$, may cause the host-application server 324 to (i) obtain content from the content records 526, (ii) select a conversion template from the template records 520 ("selected-conversion template"), (iii) apply the selected-conversion template to the content to convert such content, and (iv) store results therefrom in the content records 526. Examples of the conversion task's parameters may include a conversion-template entry, a content entry and a destination-location entry. The conversion-template, content and destination-location entries may be expressed as characters, strings of characters, expressions, templates, variables and/or the like.

The conversion-template entry may include a reference to the selected-conversion template. This reference may refer to any one of the conversion templates stored in the template records 520. The content entry may include information for obtaining the content from the content records 526. This information may include a name and/or an address assigned to or otherwise associated with the content in the content records 526. Alternatively, the information may include a reference, pointer, URI or other indicator to a location of the content in the content records 526.

The destination-location entry may include information for storing the results in the content records 526. This information may include a name, address, reference, pointer, URI or other indicator to a location in the content records 526.

Semantic-Protocol Task Example

The semantic-protocol task, as represented by the semantic-protocol widget $132_{20}$, includes an input and at least two outputs; and each of the outputs may be connected to a different branch of the workflow. In operation, the semantic-protocol task may cause the host-application server 324 to execute one or more of the branches of the workflow responsive to receiving or otherwise obtaining content ("input content") that matches or otherwise conforms to a given schema template.

To facilitate this, the semantic-protocol task may cause the host-application server 324 to (i) select from the template records 520 a schema template ("selected-schema template"); (ii) compare the input content to some or all of the schema of the selected-schema template to determine if the input content matches or otherwise conforms to such schema; and (iii) enable or otherwise activate the output(s) of the semantic-protocol task that coincide with the determination of matches between the input content and the schema.

The semantic-protocol task's parameters may include a reference to the selected validation template. This reference may include a name, address, reference, pointer, URI or other indicator to a location of the validation template in the templates records 520.

Delete Task Example

The delete task, as represented by the delete widget $132_{21}$, may cause the host-application server 324 to delete or mark for deletion one or more records and/or files stored on the memory 328. The delete task's parameters may include a reference to the records or files that are to be deleted or marked for deletion. This reference may include names and/or address of the records and/or files, and/or pointers, URIs or other indicators to a location of the records and/or files on the memory. The reference may be expressed as a character, a string of characters, an expression, a variable and/or the like.

Validate Task Example

The validate task, as represented by the validate widget $132_{22}$, may cause the host-application server 324 to verify that a structure (e.g., a logical structure) of a record ("evaluation record") obtained from the content records 526 conforms to the validation template specified in the validate task. Alternatively and/or additionally, the validate task may cause the host-application server 324 to validate that content in the evaluation record conforms to a set of rules specified in the validate task's parameters. The validate task may also cause the host-application server 324 to execute one or more of the tasks as a function of an outcome of the validation. For instance, the host-application server 324 may perform one or more of the tasks if the outcome of the validation indicates a successful validation. If, however, the outcome of the validation indicates an unsuccessful validation, then the host-application server 324 may issue an error message indicating such unsuccessful validation.

Examples of the validate task's parameters include a validation entry, a content entry and a destination-location entry. The validation, content and destination-location entries may be expressed as characters, strings of characters, expressions, templates, variables and/or the like.

The validation entry may include information for retrieving or otherwise obtaining from the template records 520 the validation template and/or the validation rules. This may include, for example, names and/or addresses associated with the validation template and/or the validation rules. Alternatively, the information may include a reference, pointer, URI or other indicator to a location of the validation template and/or the validation rules in the template records 520. The validation entry may also include information for specifying one or more of the tasks for execution responsive to the outcome (e.g., success or failure) of the validation.

The content entry may include information for retrieving or otherwise obtaining the evaluation record and content therein from the content records 526. This information may include a name and/or an address assigned to or otherwise associated with the evaluation record in the content records 526. Alternatively, the information may include a reference, pointer, URI or other indicator to a location of the evaluation record in the content records 526.

The destination-location entry may include information for storing the results generated in response to executing the validation task. This information may include a name, address and/or reference, pointer, URI or other indicator to a location in the content records 526.

TCP-Listen, TCP-Get and TCP-Send Tasks Examples

The tcp-listen, tcp-get and tcp-send tasks, as represented by the tcp-listen, tcp-get and tcp-send widgets $132_{23}$-$132_{25}$ are similar to the http-listen, http-respond and http-send tasks described above, except for application of details for carrying out differences between TCP and HTTP communication protocols (e.g., TCP typically does not have a URL parameter). Such details are known, and are not included here for simplicity of exposition.

Wait Task Example

The wait task, as represented by the wait widget $132_{26}$, causes the host-application server 324 to pause the execution of the workflow and/or one or more of the workflow branches for a given amount of time. The wait task's parameters include an entry for specifying an amount of time to pause the execution. This parameter may be expressed as a character, a string of characters, a variable, an expression and/or the like.

Get-Email Task Example

The get-email task, as represented by the get-email widget $132_{27}$, may cause the host-application server 324 to retrieve or otherwise obtain an email message (with or without attachment) from the service-email server 518, via the host-email engine, and transfer the email message to the email records for subsequent retrieval. Examples of send-email task's parameters may include a get-email-service-definition entry. The get-email-service-definition entry may be expressed as a character, string of characters and/or variables.

The get-email-service-definition entry may include a reference to a previously configured service definition that identifies an email service for carrying out the get-email task. This service definition ("get-email-service definition") may include a number of parameters, which may be stored on the memory 338 in the service-definition record 522. As an alternative, the information in or information analogous to the get-email-service definition and associated parameters ("get-email-service parameters") may be included in the get-email task's parameters instead of the service definition records 522.

The get-email-service parameters may include a setting identifying service-email server 518. This setting may be a domain of the service-email server 517, for example, and/or type of service, e.g., POP, IMAP, and other email service types. The get email-service parameters may also include information for storing the email message and/or email attachments in the content records 526. This information may include a name, address and/or reference, pointer, URI or other indicator to a location in the content records 526.

Although the email-service definition and associated email-service parameters are described herein as being included in the service definition records 522, the email-service definition and the parameters included therein may be dispensed with. If dispensed with, the get-email task's parameters may include information for configuring the email service.

Copy Task Example

The copy task, as represented by the copy widget $132_{28}$, may cause the host-application server 324 to evaluate an expression to produce results, and transfer the results to one or more of the results records in the content records 526. The copy task may also cause the host-application server 324 to create results records; and/or overwrite any of the results records in the content records 526.

Examples of the copy task's parameters may include an expression entry and location-destination entry. The expression definition may include an expression (e.g., a formula).

The location-destination entry may include information for storing the results in one or more of the results records. This information may include a name or address assigned to or otherwise associated with results records. Alternatively, the information for the location-destination entry may include a reference, pointer, URI or other indicator to a location in the content records 526.

Iterate Task Example

The iterate task, as represented by the copy widget $132_{29}$, may cause the host-application server 324 to iterate a specified number of times one the tasks ("iterated task") using a set of content obtained from the content records 526. Alternatively, the iterate task may cause the host-application server 324 to iterate the iterated task over an entire set of content obtained from the content records 526. By way of example, the iterate task may cause the host-application server 324 to iterate the send-email task so as to create and transmit an email to email addresses of multiple recipients contained within the set of content (e.g., a mailing list) obtained from the content records 526. This iteration may be carried out a specified number of times or for so long as content remains in the set of content obtained from the content records 526.

Examples of the iterate task's parameters may include a collection entry and an iterate-flag entry. The collection and iterate-flag entries may be expressed as characters, strings of characters, expressions, templates, variables and/or the like.

The collection entry includes information for retrieving or otherwise obtaining from the content records 526 the set of content for input to the iterated tasks. This information may include a name and/or an address assigned to or otherwise associated with the set of content in the content records 526. Alternatively, the information may include a reference, pointer, URI or other indicator to a location of the set of content in the content records 526.

The iterate-flag entry may include information for defining a flag for indicating completion of the iterate task (e.g., no unprocessed content remains in the set of content).

Launch-Workflow Task Example

The launch-workflow task, as represented by the workflow widget $132_{30}$, may cause the host-application server 324 to (i) select the recorded workflow from the recorded-workflow records 528, and (ii) trigger an execution of the recorded workflow. To trigger the execution, the launch-workflow task may cause the host-application server 324 to obtain from the content records 526 the input information for the execution of the recorded workflow. In addition, the launch-workflow task may cause the host-application server 324 to execute the recorded workflow in a synchronous or an asynchronous mode.

In the synchronous mode, the launch-workflow task may cause the host-application server 324 to execute and complete the recorded workflow before executing another task in the workflow or in the workflow branch containing the launch-workflow task. Following the execution of the recorded workflow, the launch-workflow task may cause the host-application server 324 to store in content records 526 the results from the execution of the recorded workflow as input information for another of the tasks.

In asynchronous mode, the launch-workflow task may cause the host-application server 324 to execute the recorded workflow, and without waiting for completion of the recorded workflow, continue execution of other tasks of the workflow or in the workflow branch containing the launch-workflow task. The launch-workflow task might not cause the host-application server 324 to obtain the input information for another task.

Examples of the launch-workflow task's definitions may include a recoded-workflow definition, recorded-workflow-input definition, a launch-workflow mode and a return-information definition. The recorded workflow and return information definitions may be expressed as characters, strings of characters, expressions, templates, variables and/or the like.

The recorded-workflow definition may include information for retrieving or otherwise obtaining the recorded workflow from the recorded-workflow records. This information may include a name or address assigned to or otherwise associated with the recorded-workflow file 556 or, alternatively, a pointer to a location of the recorded-workflow file 556 on the memory 328.

The recorded-workflow-input definition may include information for retrieving or otherwise obtaining from content records 526 the input information for the recorded-workflow input. This information may include a name or address assigned to or otherwise associated with the content records 526 or, alternatively, a pointer to a location of the content records 526 on the memory 328.

The launch-workflow-mode definition may include information for designating the synchronous or asynchronous mode. The return information definition may include information for obtaining the results from the content records 526. This information may include a name or address assigned to or otherwise associated with the content records 526 or, alternatively, a pointer to a location of the content records 526 on the memory 328.

Example Architecture for Triggering a Workflow Deployment and/or Execution

Figure 7:
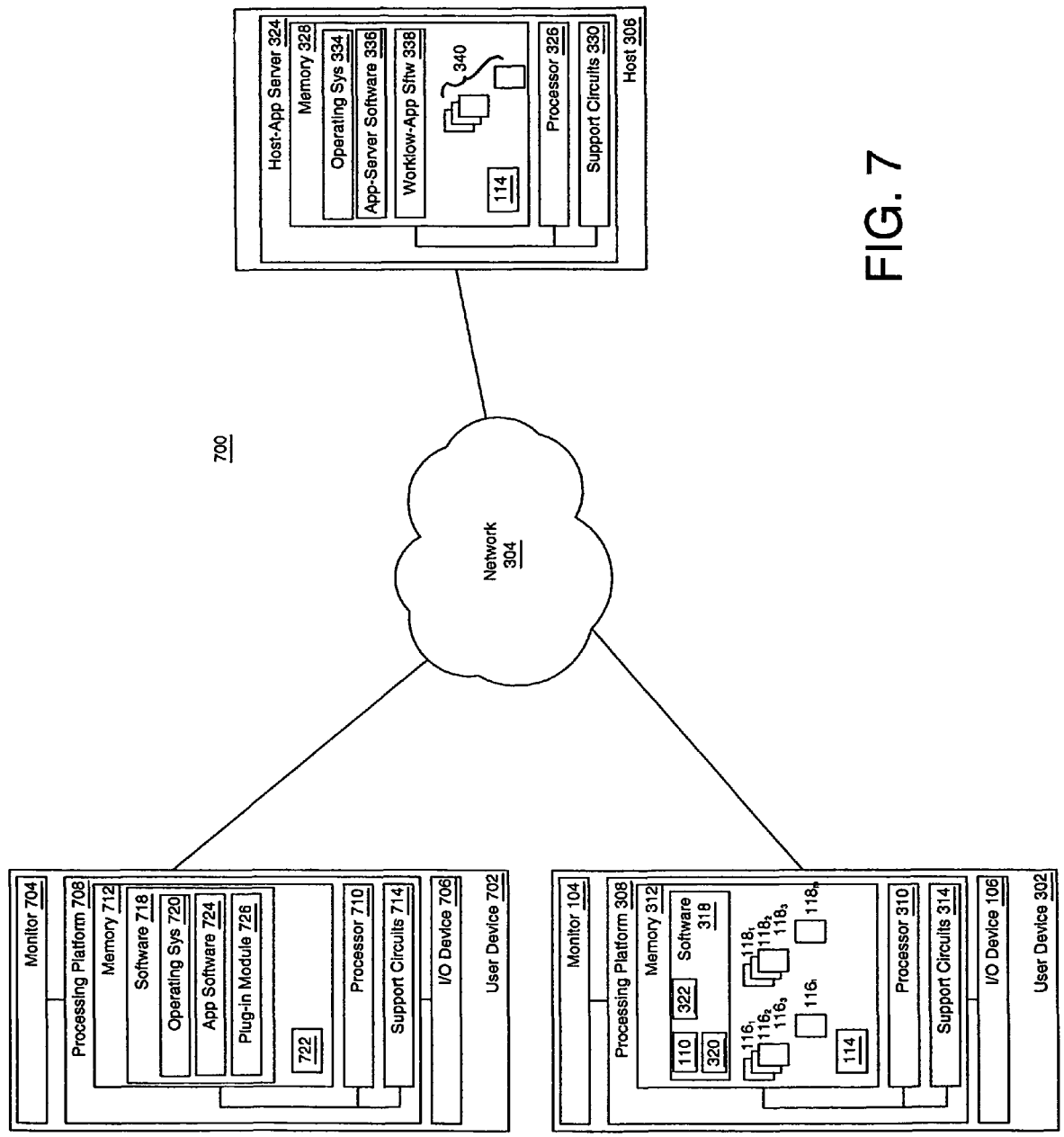
FIG. 7 is a block diagram illustrating a system for triggering a deployment and/or execution of a workflow.

FIG. 7 is a block diagram illustrating a system 700 for triggering a deployment of a workflow. The system 700 is similar to the system 300 of FIG. 3, except as described herein. The system 700 includes the user device 302, the host 306, and a second user device 702; each of which may be communicatively coupled to another via the network 304.

To not obscure the following description with details and/or features of elements of the system 300 described above, some of these details and/or features are not repeated in the following description or shown in FIG. 7. Other details and/or features not described and/or not shown in FIG. 3 are presented.

The second user device 702 is similar to the user device 300 of FIG. 3, except as described herein below. The second user device 702 may be any computing device, system and the like, and may be formed in a single unitary device and concentrated on a single server, client, peer or other type node. Alternatively, the second user device 702 may be formed from one or more separate devices, and as such, may be distributed among a number of server, client, peer or other type nodes. In addition, the second user device 702 may be scaleable (i.e., may employ scale-up and/or scale-out approaches).

The second user device 702 may include a large number of elements; many of which are not shown in FIG. 7 for simplicity of exposition. As shown in FIG. 7, the second user device 702 includes a second processing platform 704 that is operable to control, manipulate or otherwise interact with a second monitor 706 and/or a second I/O device 708, via respective couplings.

The second monitor 706 may be any suitable device that displays viewable images generated by the second processing platform 704, such as listed above with respect to the second monitor 104. The second I/O device 708 may be any device that accepts input from a user (man or machine) to control, manipulate or otherwise interact with the operation of the second processing platform 704, such as listed above with respect to the I/O device 106.

The second processing platform 704 includes one or more processing units (collectively "second processor") 710, a second memory 712, second support circuits 714 and a second bus 716. The second processor 710 may be one or more conventional processors, microprocessors, multi-core processors and/or microcontrollers. The second support circuits 714 facilitate operation of the second processor 710 and may include well-known circuitry or circuits, including, for example, an I/O interface; one or more network-interface units ("NIUs"); cache; clock circuits; power supplies; and the like.

The second processor 710 may use the NIUs for exchanging content with the host 306 via the network 304. Accordingly, the NIUs may be adapted for communicating over any of the terrestrial wireless, satellite, and/or wireline media.

The second memory 712 may store user-device software 718 and various other stored software packages, such as a second operating system 720. The memory 712 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like. In addition, the memory 712 may store (and receive requests from the second processor 710 to obtain) one or more records 722, operands, operators, dimensional values, configurations, and other data that are used by the operating system 720 and the user-device software 718 to control the operation of and/or to facilitate performing the functions of the second user device 702.

The second bus 720 provides for transmissions of digital information among the second processor 710, the second memory 712, the second support circuits 714 and other portions of the second user device 702 (shown and not shown). The I/O interface is adapted to control transmissions of digital information between (shown and not shown) components of the user device 702. In addition, the I/O interface is adapted to control transmissions of digital information between I/O devices disposed within, associated with or otherwise attached to the user device 702. Examples of the I/O devices include the second I/O device 706, the second monitor 704, and any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) the like.

The second operating system 720 may include code for operating the second user device 702 and for providing a platform onto which the user-device software 718 can be executed. The user-device software 718 may carry out the exchange of the workflow content using communication and security protocols compatible with the second user and host devices 702, 306.

The user-device software 718 may be in any of a standalone, client/server, peer-to-peer and other format, and may include, in a standalone or peer-to-peer format, code for accessing services offered by the host 306. Through this code, the user-device software 718 is operable to substantiate its identity, and in turn, receive authorization to obtain one or more of the services offered by the host 306.

The user-device software 718 may include user-application software 724. The user-application software 724 may include, for example, software for one or more (or any combination) of word-processing, spreadsheet, database, email, instant-messenger, presentation, Internet-browser, calendar/organizer, media (e.g., video, audio, image playing and/or recording), multimedia application; file management programs; operating system shells; and/or other applications capable of being executed by a user device. The user-application software 724 may also include software for client-side applications, such as client-side applications that interact with or access other client or remote applications (for example, a web-browser executing on the second user device 702 that interacts with a remote e-mail server to access e-mail).

A user of the second user device 702 can interact with the user-application software 724 and records 722 associated with such user-application software 724 via the various I/O devices, such as the I/O device 706. These records 722 may include, for example, one or more (or any combination of) word-processor documents, spreadsheet documents, database documents, presentation documents, emails, instant-messenger messages, database entries, calendar entries, appointment entries, task manager entries, source code files, and other user application program content, files, messages, items, web pages of various formats, such as HTML, XML, extensible HTML ("XHTML"), Portable Document Format ("PDF") files, and media files, such as image files, audio files, and video files, or any other documents or items or groups of documents or items or information in electronic form suitable for storage access in the second memory 712.

The user's interaction with the records 722, user-application software 724 and/or the second user device 702 may create data ("event data") that may be observed, recorded, analyzed or otherwise used, responsive to an event. Such event may be any occurrence possible associated with the records 722, user-application software 724 and/or second user device 700, such as inputting text into one or more of the records 722, displaying one or more of the records 722 on the second monitor 704, sending one or more of the records 722, receiving one or more of the records 722, manipulating the I/O devices, opening one or more of the records 722, saving one or more of the records 722, printing one or more of the records 722, closing one or more of the records, opening the user-application software 724, closing the user-application software 724, idle time, processor load, disk access, memory usage, bringing the user-application software 724 to a foreground, changing visual display details of the user-application software 724 (such as resizing or minimizing), interacting with windows associated with the user-application software 724, and any other suitable occurrence associated with the records 722, user-application software 724 and/or second user device 700, whatsoever.

Additionally, event data can be generated when the second user device 700 interacts with an article independent of interaction with the user, such as when receiving an email or performing a scheduled task. Some or all of the event data may be used as input information and/or used to populate, during execution of the workflow-executable code, one or more of the task's parameters.

In addition, any of the user-application software 724 may an ability to issue the execution command or otherwise trigger activation of the workflow. The user-application software 724 may also be adapted to exchange with the host 306 event data, records and other content, which may be used as input information and/or used to populate, during execution of the workflow-executable code, one or more of the task's parameters.

Alternatively, the user-application software 724 may be fitted or otherwise associated with a module 726 that adds functionality that is not native to such user-application software 724. This module 726, for example, may add to the user-application software 724 an ability to issue the execution command or otherwise trigger activation of the workflow. In addition, the module 726 may be adapted to exchange with the host 306 event data, records and other content, which may be used as input information and/or used to populate, during execution of the workflow-executable code, one or more of the task's parameters.

The module 726, when executed by the second processor 710, may register with, embed into, link to, integrate into or otherwise combine (collectively "register") with any of the user-application software 724. The module 726 may also be updated or otherwise modified, including being disabled and/or removed from the user-application software 724, at any time during execution of the user-application software 724.

To facilitate the foregoing, the module 726 may include or be formed from code for adding the functionality that is not native to the user-application software 724. This code may be in the form of (or any combination and/or multiple of) a plug-in, an add-on, an applet, a shared library, an extension, and the like.

Although the system 700, as shown, includes both the user device 302 and the second user device 702, the user device 302 and the second user device 702 may be formed into a single device having functionality of both of the devices 302, 702. Alternatively, the user device 302 (or the second user device 702) may be adapted to include the architecture and functionality of the second user device 702 (or the user device 302) to obviate having both of the devices 302, 702.

Triggering a Workflow Deployment and/or Execution

Figure 8:
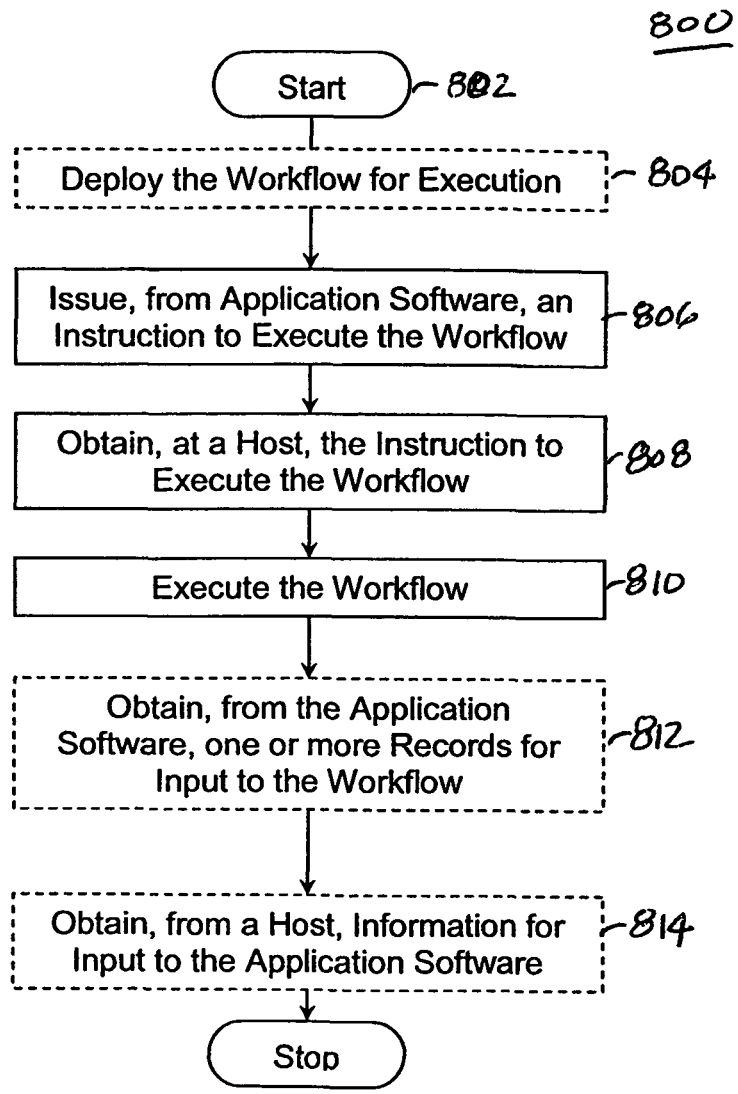
FIG. 8 is a flow diagram illustrating a flow for triggering a deployment and/or execution of a workflow.

Referring now to FIG. 8, a flow diagram illustrating an example flow 800 for triggering a deployment and/or execution of a workflow is shown. For convenience, the flow 800 is described with reference to the system 700 of FIG. 7. The flow 800, however, may be carried out using other architectures as well.

The flow 800 starts at termination block 802. After termination block 802, the flow 800 transitions to optional process block 804 or to process block 806. As shown in optional process block 804, the user device 302 and host 306 may deploy the workflow for execution. This process may include user device 302, via the GUI software 110, preparing and dispatching the workflow record 114, as for example, described above with reference to process blocks 204-208 of FIG. 2 and process block 404 of FIG. 4. In addition, the process for deploying the workflow for execution may include the host 306, via the workflow-application software 338, preparing the workflow record 114 for later interpretation, and/or generating the workflow-executable code as a function of the workflow record 114. The workflow-application software 338 may do so in accordance with the process blocks 408 of FIG. 4.

After process block 804, the workflow is ready for execution, and can be executed repeatedly without being redeployed. The workflow, however, may be redeployed if desired. After process block 804, the flow 800 transitions to process block 806.

As shown in process block 806, the second user device 702, via the user-application software 724, issues to the host 306 the execution command or other instruction to trigger activation of the workflow (collectively "triggering instructions").

The second user device 702 may do so via the application software 724 directly and/or via the module 726.

For example, the second processor 710 executes the user-application software 724 so as to enable creation of event data, and in turn, the records 722. Responsive to (user or other) interaction, the user-application software 724 may issue the triggering command to the host 306 via the network 304. Alternatively, the second processor 710 may execute the module 726. As such the module 726 registers with the user-application software 724 to provide the ability to issue the triggering instructions.

As an alternative to user interaction causing the issuance of the triggering instructions, the user-application software 724 and/or the module 726 may be configured to issue the triggering instructions as a result of a condition, such as one of the events noted above. As another alternative, the user-application software 724 and/or the module 726 may be configured to issue the triggering instructions on a periodic or continuous basis.

To facilitate flow control, the user-application software 724 and/or the module 726 may form an interrupt request and await a confirmation of completion of the execution of the workflow before resuming other activities. Alternatively, the user-application software 724 and/or the module 726 may form an interrupt request but resume other activities while awaiting confirmation of completion of the execution of the workflow. After process block 806, the flow 800 transitions to process block 808.

As another alternative, the flow 800 may repeat process block 806 multiple times before transitioning to process block 808. By repeating process block 806, the second user device 702, via the user-application software 724 and/or the module 726, may issue to the host 306 multiple instances of the triggering instructions. These multiple instances may cause the host 306 to execute (i) the same workflow a number of times, (ii) multiple workflows, and/or (iii) any combination thereof. As above, the user-application software 724 and/or the module 726 may form an interrupt request and (i) await a confirmation of completion of the execution of the workflow before resuming other activities or (ii) resume other activities while awaiting confirmation of completion of the execution of the workflow.

At process block 808, the host 306 may obtain the triggering instructions from the user-application software 724 and/or the module 726. Responsive to obtaining the triggering instructions, the flow 800 transitions to process block 808.

As shown in process block 810, the host 306 may execute the workflow. The host 306 may do so in accordance with the process blocks 412 and 414 of FIG. 4. As such, the host 306, via the workflow-application software 338, may interpret the workflow record 114, and/or execute the workflow-executable code. The host 306 may execute the workflow in other ways as well.

To facilitate flow control, the host 306 may signal to the user-application software 724 that the workflow is executing, completed execution and/or in another condition so as to attend to the interrupt request. After the process block 810, the flow 800 may transition to optional process block 812.

As shown in process block 812, the host 306 may obtain, from the event data, records 722 and other content associated with the user-application software 724 and/or the module 726, the input information for input into the workflow during execution of the workflow. To facilitate this, the host 306 may request and receive from user-application software 724 and/or the module 726 the event data (e.g., via interaction with the user), the records 722 and/or portions thereof for use as the input information.

For example, the application software 724 may be embodied as spreadsheet and/or database application. The module 726, as registered with the spreadsheet and/or database application, may obtain the input information from specified coordinates associated with one or more cells of a spreadsheet and/or a database table. These cells may include fixed numbers, variables, formulas, etc. The input information obtained from the cells may be in the same form as the cells. Alternatively, the input information obtained from the cells may be values resulting from application of the formulas or variables included within such cells.

After the process block 812, the flow 800 may transition to optional process block 814. At process block 814, the user-application software 724 and/or the module 726 obtains, from the host 306, information output ("output information") from the workflow. To facilitate this, the user-application software 724 and/or the module 726 may request and receive the output information from the host 306.

For example, the application software 724 may be embodied as spreadsheet and/or database application. The module 726, as registered with the spreadsheet and/or database application, may obtain the input information from specified coordinates associated with one or more cells of a spreadsheet and/or a database table. These cells may include fixed numbers, variables, formulas, etc. The module 726 may update the cells with the output information obtained from the host 306.

After the process block 814, the flow 800 transitions to termination block 816, at which point the flow 800 terminates. Alternatively, the flow 800 may be repeated periodically, in continuous fashion, or upon being triggered as a result of a condition, such as a command or trigger. As another alternative, the process blocks 806-810 may be repeated periodically, in continuous fashion, or upon being triggered as a result of a condition, such as issuance of additional triggering instructions, so as to re-execute the workflow.

CONCLUSION

Variations of the apparatus and method described above are possible without departing from the scope of the invention. For instance, in the examples described above, controllers and other devices containing processors are noted. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the examples are not limited to the above-mentioned memories and that other platforms and memories may support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method comprising:
   issuing, to a first device from application software executing on a second device, an instruction to execute a workflow deployed at the first device, the workflow being formed as a function of information associated with a graphical representation of the workflow, wherein the application software comprises software for any of a word-processing application, a spreadsheet application, a database application, an email application, an instant messenger application, a presentation application, a browser application, a calendar application, an organizer application, a media application, an image display application, a file management program, and an operating system shell;
   generating, at the first device as a function of the information associated with a graphical representation of the workflow, executable instructions for executing the workflow, wherein the instruction to execute comprises an instruction to execute the executable instructions, wherein generating the executable instructions occurs responsive to information dispatched from a graphical-user interface, wherein the information associated with a graphical representation of the workflow comprises a record, and wherein the instruction to execute comprises an instruction to interpret the record, wherein the information associated with a graphical representation of the workflow emanates from a graphical-user interface;
   providing, via the application software, information for input to the workflow, wherein the workflow comprises a plurality of tasks, and wherein providing information for input to the workflow comprises providing, via the application software, information for input to at least one of the plurality of tasks of the workflow; and
   executing the plurality of tasks on a plurality of remote devices, wherein event data generated on a first remote device when the first remote device interacts with an article during execution of a first task is used as input information, independent of interaction with the graphical-user interface, to populate at least one task parameter, wherein the task parameter is used during execution of the executable instructions to perform a second task on a second remote device, wherein a user interaction with at least one of a record, or the second remote device generates data, wherein the data is used to populate at least one task parameter, wherein the task parameter is used during execution of the executable instructions to perform a third task on a third remote device.

2. The method of claim 1, wherein the application software comprises a module associated with software for any of a word-processing application, a spreadsheet application, a database application, an email application, an instant messenger application, a presentation application, a browser application, a calendar application, an organizer application, a media application, an image display application, a file management program, and an operating system shell.

3. The method of claim 2, wherein the module comprises any or any combination of a plug-in, an add-on, an applet, a shared library, and an extension, wherein the module adds functionality that is not native to the application software and obtains output information from the workflow.

4. A non-transitory computer-readable medium comprising program instructions, wherein the program instructions are computer-executable to implement:
   issuing, to a first device from application software executing on a second device, an instruction to execute a workflow deployed at the first device, the workflow being formed as a function of information associated with a graphical representation of the workflow, wherein the application software comprises software for any of a word-processing application, a spreadsheet application, a database application, an email application, an instant messenger application, a presentation application, a browser application, a calendar application, an organizer application, a media application, an image display application, a file management program, and an operating system shell;
   generating, at the first device as a function of the information associated with a graphical representation of the workflow, executable instructions for executing the workflow, wherein the instruction to execute comprises an instruction to execute the executable instructions, wherein generating the executable instructions occurs responsive to information dispatched from a graphical-user interface, wherein the information associated with a graphical representation of the workflow comprises a record, and wherein the instruction to execute comprises an instruction to interpret the record, wherein the information associated with a graphical representation of the workflow emanates from a graphical-user interface;
   providing, via the application software, information for input to the workflow, wherein the workflow comprises a plurality of tasks, and wherein providing information for input to the workflow comprises providing, via the application software, information for input to at least one of the plurality of tasks of the workflow; and
   executing the plurality of tasks on a plurality of remote devices, wherein event data generated on a first remote device during execution of a first task is used independent of interaction with the graphical-user interface, as input information to populate at least one task parameter, wherein the task parameter is used during execution of the executable instructions to perform a second task on a second remote device, wherein a user interaction with at least one of a record, or the second remote device generates data, wherein the data is used to populate at least one task parameter, wherein the task parameter is used during execution of the executable instructions to perform a third task on a third remote device.

5. The non-transitory computer-readable medium of claim 4, wherein the application software comprises a module associated with software for any of a word-processing application, a spreadsheet application, a database application, an email application, an instant messenger application, a presentation application, a browser application, a calendar application, an organizer application, a media application, an image display application, a file management program, and an operating system shell.

6. The non-transitory computer-readable medium of claim 5, wherein the module comprises any or any combination of a plug-in, an add-on, an applet, a shared library, and an extension, wherein the module adds functionality that is not native to the application software and obtains output information from the workflow.

7. A system for triggering a workflow deployment comprising:
   a) at least one processor;
   b) at least one input device coupled to at least one network; and
   c) at least one storage device storing processor executable instructions which, when executed by the at least one processor, performs a method including:
      i. issuing, to a first device from application software executing on a second device, an instruction to execute a workflow deployed at the first device, the workflow being formed as a function of information associated with a graphical representation of the workflow, wherein the application software comprises software for any of a word-processing application, a spreadsheet application, a database application, an email application, an instant messenger application, a presentation application, a browser application, a calendar application, an organizer application, a media application, an image display application, a file management program, and an operating system shell;
      ii. generating, at the first device as a function of the information associated with a graphical representation of the workflow, executable instructions for executing the workflow, wherein the instruction to execute comprises an instruction to execute the executable instructions, wherein generating the executable instructions occurs responsive to information dispatched from a graphical-user interface, wherein the information associated with a graphical representation of the workflow comprises a record, and wherein the instruction to execute comprises an instruction to interpret the record, wherein the information associated with a graphical representation of the workflow emanates from a graphical-user interface;
      iii. providing, via the application software, information for input to the workflow, wherein the workflow comprises a plurality of tasks, and wherein providing information for input to the workflow comprises providing, via the application software, information for input to at least one of the plurality of tasks of the workflow; and
      iv. executing the plurality of tasks on a plurality of remote devices, wherein event data generated on a first remote device when the first remote device interacts with an article during execution of a first task is used as input information, independent of interaction with the graphical-user interface, to populate at least one task parameter, wherein the task parameter is used during execution of the executable instructions to perform a second task on a second remote device, wherein a user interaction with at least one of a record, or the second remote device generates data, wherein the data is used to populate at least one task parameter, wherein the task parameter is used during execution of the executable instructions to perform a third task on a third remote device.

8. The system of claim 7, wherein the application software comprises a module associated with software for any of a word-processing application, a spreadsheet application, a database application, an email application, an instant messenger application, a presentation application, a browser application, a calendar application, an organizer application, a media application, an image display application, a file management program, and an operating system shell.

9. The system of claim 8, wherein the module comprises any or any combination of a plug-in, an add-on, an applet, a shared library, and an extension, wherein the module adds functionality that is not native to the application software and obtains output information from the workflow.

* * * * *